US012754756B2

(12) United States Patent
Bilgen et al.

(10) Patent No.: US 12,754,756 B2
(45) Date of Patent: Oct. 6, 2026

(54) SECURE VIRTUALIZED CRYPTOGRAPHIC SUBSYSTEMS FOR AUTONOMOUS SYSTEMS AND APPLICATIONS

(71) Applicant: NVIDIA CORPORATION, Santa Clara, CA (US)

(72) Inventors: Mustafa Bilgen, Brookline, MA (US); Leo Chiu, New Taipei City (TW); Arun Gona, Bothell, WA (US); Mihir Joshi, Santa Clara, CA (US); John Moser, Lake Stevens, WA (US); Hyung Taek Ryoo, Pleasanton, CA (US); Akshay Sharan, Seattle, WA (US); Stephen Wolfe, San Jose, CA (US); Shufeng Yu, Beijing (CN)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 18/569,584

(22) PCT Filed: Oct. 11, 2023

(86) PCT No.: PCT/CN2023/124009

§ 371 (c)(1),
(2) Date: Dec. 12, 2023

(65) Prior Publication Data

US 2026/0154098 A1 Jun. 4, 2026

(51) Int. Cl.

| | |
|---|---|
| ***G06F 21/00*** | (2013.01) |
| ***G06F 9/455*** | (2018.01) |
| ***H04L 9/08*** | (2006.01) |

(52) U.S. Cl.
CPC ........ *G06F 9/45558* (2013.01); *H04L 9/0897* (2013.01); *G06F 2009/45587* (2013.01)

(58) Field of Classification Search
CPC ....... G06F 9/45558; G06F 2009/45587; H04L 9/0897
See application file for complete search history.

(56) References Cited

U.S. PATENT DOCUMENTS

| | | | | |
|---|---|---|---|---|
| 11,537,421 | B1 * | 12/2022 | Brooker | H04L 9/0894 |
| 2015/0220745 | A1 * | 8/2015 | Nellitheertha | G06F 21/602 713/193 |
| 2022/0374763 | A1 * | 11/2022 | Gu | G06N 20/00 |

* cited by examiner

*Primary Examiner* — William A Corum, Jr.
(74) *Attorney, Agent, or Firm* — Squire Patton Boggs LLP; Sarah Mirza

(57) ABSTRACT

In various examples, the disclosed techniques include receiving, from an application executing in a virtual machine (VM), a request to perform a cryptographic operation, wherein the request specifies an ephemeral key identifier and source data. The techniques also determine, using key metadata received from a trusted execution environment, a key slot identifier associated with the ephemeral key identifier, wherein the key slot identifier identifies a key slot in which a cryptographic key is stored. The techniques further cause the cryptographic operation to be performed on the source data in the trusted execution environment using the cryptographic key, where the cryptographic key used to perform the cryptographic operation is accessed from the key slot identified by the key slot identifier. The techniques further provide, to the application, a cryptographic operation result received form the trusted execution environment.

20 Claims, 10 Drawing Sheets

Trusted-Side Key Metadata Table
126

| Key Slot Identifier 302 | Guest VM ID 304 | Application ID 306 | Ephemeral Key ID 308 | Allowed Operations 310 | Key Expiration Time 312 | Static Key ID 314 |
|---|---|---|---|---|---|---|
| KS-1 | VM-1 | App-1 | EK-1 | Encrypt, Decrypt | Time-1 | Key-1 |
| KS-2 | VM-1 | App-2 | EK-2 | CBC AES Encrypt, Generate MAC | Time-2 | Key-2 |
| KS-3 | VM-2 | App-3 | EK-3 | CBC AES Decrypt, Verify MAC | Time-3 | Key-3 |

FIGURE 3

SECURE VIRTUALIZED CRYPTOGRAPHIC SUBSYSTEMS FOR AUTONOMOUS SYSTEMS AND APPLICATIONS

CROSS-REFERENCE TO RELATED APPLICATIONS

The present application is a national stage application of the international application titled, "SECURE VIRTUALIZED CRYPTOGRAPHIC SUBSYSTEMS FOR AUTONOMOUS SYSTEMS AND APPLICATIONS," filed on Oct. 11, 2023, and having application number PCT/CN2023/124009. The subject matter of this related application is hereby incorporated herein by reference.

BACKGROUND

Secure computing systems provide data confidentiality, which protects data from being accessed by unauthorized entities, and data integrity, which protects data from being modified by unauthorized entities. Data confidentiality and integrity are implemented using cryptography. Data that is stored in memory, for example, can be in encrypted form. A processor decrypts the data stored in memory prior to performing operations using the data. To protect the data during processor operations, the operations can be performed in a Trusted Execution Environment (TEE). Secure computation systems use a substantial amount of processing resources to perform operations such as encryption and decryption. Some applications, such as automotive systems, have requirements for secure computations that can be performed under strict time constraints with limited computational resources. For example, in an automotive system, a security sub-system is involved in protecting core vehicle operations by verifying the integrity of real-time sensor data and vehicle actuation commands. Providing a desired level of security with sufficiently high performance is difficult in systems that have limited computational resources.

Various approaches have been implemented to provide security in systems having limited computational resources. One approach is to perform cryptographic operations using special-purpose hardware that is customized to perform well in a particular application. However, special-purpose hardware is time-consuming to implement and is not generally adaptable to different applications. For example, inline encryption engines can be implemented using hardware devices to encrypt and decrypt data as the data is sent to or received from a storage device. Inline encryption engines are thus tailored for specific use cases that involve input/output operations, and do not provide general-purpose encryption operations that could be used by applications to encrypt any specified portion of application data stored in memory. Accordingly, existing security subsystems use more computational resources than are available on resource-constrained computing devices, and existing approaches to improving cryptographic performance do not provide general-purpose cryptographic operations that are adaptable to different uses.

As such, a need exists in secure computation systems for more effective techniques for providing data confidentiality and data integrity.

SUMMARY

Embodiments of the present disclosure relate to performing cryptographic operations securely in a virtualized computing environment. In various examples, the disclosed techniques receive, from an application running in a virtual machine (VM), a request to perform a cryptographic operation, where the request specifies an ephemeral key identifier and source data. The techniques further determine, using key metadata received from a trusted execution environment (TEE), a key slot identifier associated with the ephemeral key identifier, wherein the key slot identifier identifies a key slot in which a cryptographic key is stored. The techniques further cause the cryptographic operation to be performed on the source data in the TEE using the cryptographic key, where the cryptographic key used to perform the cryptographic operation is accessed from the key slot identified by the key slot identifier. The techniques further provide, to the application, a cryptographic operation result received from the TEE.

One technical advantage of the disclosed techniques relative to prior solutions is that cryptographic operations, such as encryption and decryption, execute in less time, since the cryptographic operations are performed by a secure engine server without switching the processor to the TEE. By contrast, prior approaches switch to the TEE for each cryptographic operation requested by an application. Switching to the TEE and back to the non-trusted execution environment for a cryptographic operation substantially increases execution time of cryptographic operations caused by the repeated switching of the processor execution context as applications request cryptographic. Another technical advantage of the disclosed techniques is that the cryptographic operations are general purpose operations that can be performed on data in memory locations specified by applications. Thus, the disclosed techniques can be used by applications to encrypt any specified data at any point during application execution with minimal or no additional processing or conversion to adapt the data for use by an inline encryption engine or other special-purpose hardware.

BRIEF DESCRIPTION OF THE DRAWINGS

The present systems and methods for performing cryptographic operations securely in a virtualized computing environment are described in detail below with reference to the attached drawing figures, wherein:

FIG. 3 illustrates key metadata tables, according to various embodiments;

DETAILED DESCRIPTION

Systems and methods are disclosed for performing cryptographic operations securely in a virtualized computing environment. Although the present disclosure may be described with respect to an example autonomous or semi-autonomous vehicle or machine 500 (alternatively referred to herein as "vehicle 500" or "ego-machine 500," an example of which is described with respect to FIGS. 5A-5D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to automotive systems, this is not intended to be limiting, and the systems and methods described herein may be used in augmented reality, virtual reality, mixed reality, robotics, security and surveillance, autonomous or semi-autonomous machine applications, and/or any other technology spaces where cryptography may be used.

Figure 1:
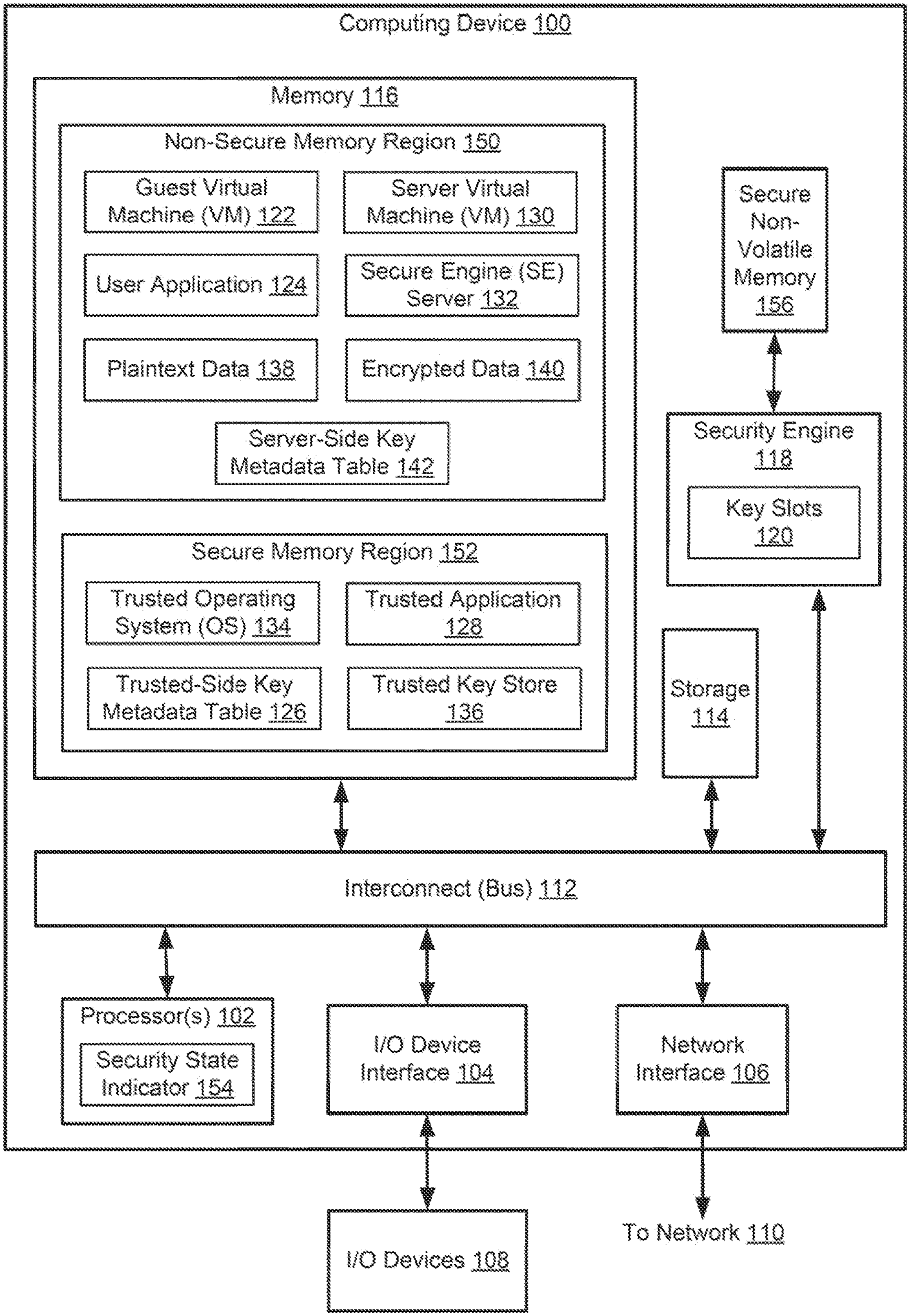
FIG. 1 illustrates a computing device configured to implement one or more aspects of various embodiments.

FIG. 1 illustrates a computing device 100 configured to implement one or more aspects of various embodiments. In at least one embodiment, computing device 100 includes a desktop computer, a laptop computer, a smart phone, a personal digital assistant (PDA), a tablet computer, a server, one or more virtual machines, an embedded system, a system on a chip, a computing system of an autonomous, semi-autonomous, or a non-autonomous machine, and/or any other type of computing device configured to receive input, process data, and optionally display information, and is suitable for practicing one or more embodiments. Computing device 100 is configured to run one or more guest virtual machines (guest VMs) 122, one or more server virtual machines (server VMs) 130, and a trusted operating system (trusted OS) 134 that can reside in a memory 116. It is noted that the computing device described herein is illustrative and that any other technically feasible configurations fall within the scope of the present disclosure. For example, multiple instances of guest VM 122, server VM 130, and/or trusted OS 134 can execute on a set of nodes in a distributed and/or cloud computing system to implement the functionality of computing device 100. Alternatively, computing device 100 can be implemented similar to that of the computing device of the example autonomous or semi-autonomous machine 500 described at least with respect to FIGS. 5A-5D.

In at least one embodiment, computing device 100 includes, without limitation, an interconnect (bus) 112 that connects one or more processors 102, an input/output (I/O) device interface 104 coupled to one or more input/output (I/O) devices 108, memory 116, a storage 114, and/or a network interface 106. Processor(s) 102 can include any suitable processor implemented as a central processing unit (CPU), a graphics processing unit (GPU), an application-specific integrated circuit (ASIC), a field programmable gate array (FPGA), an artificial intelligence (AI) accelerator, a deep learning accelerator (DLA), a parallel processing unit (PPU), a data processing unit (DPU), a vector or vision processing unit (VPU), a programmable vision accelerator (PVA), any other type of processing unit, or a combination of different processing units, such as a CPU(s) configured to operate in conjunction with a GPU(s). In general, processor(s) 102 can include any technically feasible hardware unit capable of processing data and/or executing software applications. Further, in the context of this disclosure, the computing elements shown in computing device 100 can correspond to a physical computing system (e.g., a system in a data center or a machine) and/or can correspond to a virtual computing instance executing within a computing cloud.

In at least one embodiment, I/O devices 108 include devices capable of receiving input, such as a keyboard, a mouse, a touchpad, a VR/MR/AR headset, a gesture recognition system, a steering wheel, mechanical, digital, or touch sensitive buttons or input components, and/or a microphone, as well as devices capable of providing output, such as a display device, haptic device, and/or speaker. Additionally, I/O devices 108 can include devices capable of both receiving input and providing output, such as a touchscreen, a universal serial bus (USB) port, and so forth. I/O devices 108 can be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In at least one embodiment, network 110 is any technically feasible type of communications network that allows data to be exchanged between computing device 100 and internal, local, remote, or external entities or devices, such as a web server or another networked computing device. For example, network 110 can include a wide area network (WAN), a local area network (LAN), a wireless (e.g., WiFi) network, a cellular network, and/or the Internet, among others.

In at least one embodiment, storage 114 includes non-volatile storage for applications and data, and can include fixed or removable disk drives, flash memory devices, and CD-ROM, DVD-ROM, Blu-Ray, HD-DVD, or other magnetic, optical, or solid-state storage devices. Guest VM 122, server VM 130, and/or trusted OS 134 can be stored in storage 114 and loaded into memory 116 when executed.

In one embodiment, memory 116 includes a random-access memory (RAM) module, a flash memory unit, and/or any other type of memory unit or combination thereof. Processor(s) 102, I/O device interface 104, and network interface 106 can be configured to read data from and write data to memory 116. Memory 116 can include various software programs or more generally software code that can be executed by processor(s) 102 and application data associated with said software programs, including guest VM 122, server VM 130, trusted OS 134, and/or trusted key management application 128. Memory 116 also includes plaintext data 138 and encrypted data 140, which can be stored in the non-secure memory region 150 and can be input to or output from cryptographic operations, as described herein. Each guest VM 122 executes one or more user applications 124, which can be software programs or more generally software code provided by users of the computing device 100. For example, guest VM 122A includes two applications 124A and 124B. Further, guest VM 122B includes one user application 124C. Server VM 130 executes a secure engine server 132, which invokes cryptographic operations of a security engine 118 in response to cryptographic operation requests 216 received from a guest VM 122. The secure engine server 132 invokes the security engine 118 by sending a security engine request 218 to a hardware scheduler interface 252 of an embedded hardware module 250. The secure engine server 132 includes in the security engine request 218 a reference to a cryptographic key 270 ("key") to be used in the cryptographic operation. The references to the key 270 is referred to herein as a key slot identifier, which identifies a key slot 120 into which the key 270 has been loaded by a trusted key management application 128. The key 270 is managed by a trusted key management application 128 and stored in a TEE 228, so each key 270 is also referred to herein as a "managed key" 270. The key 270 itself is not accessible outside the TEE 228, and the secure engine server 132 uses the key slot identifier to refer to the key 270. The security engine 118 performs the requested cryptographic operation as described herein. For example, the security engine 118 can encrypt plaintext data 138 using the key 270 to form encrypted data 140. The secure engine server 132 causes the security engine 118 to perform cryptographic operations using the keys 270 that are managed by the TEE 228, but the secure engine server 132 does not execute in the TEE 228 (that is, the secure engine server 132 does not execute in the secure state of the processor 102).

The trusted key management application 128 executes in a trusted OS 134 on a hypervisor 222. The trusted OS 134 can be included in a hypervisor that manages the guest VM 122, the server VM 130, and/or other virtual machines executing on the computing device 100. The trusted OS 134 can execute a trusted key management application 128, which generates cryptographic keys 270, stores the keys 270 in memory 116 and/or storage 114, and configures a security engine 118 to use the keys 270. For example, the trusted key management application 128 can load keys from a trusted key store 136 into key slots prior to performing cryptographic operations that use the keys. The trusted OS 134 can also store information describing the keys, referred to herein as key metadata, in the trusted-side key metadata table 126 and provide the contents of the trusted-side key metadata table 126 to the secure engine server 132. The trusted OS 134 can also provide portions of the key metadata, such as key identifiers, to guest VM 122, so that guest VM 122 can specify which key 270 to use when requesting a cryptographic operation. The guest VMs 122 operate as guest VMs of the hypervisor 222. The server VM 130 can be a virtual machine or can be implemented as a service provided by the hypervisor 222, for example.

A virtualization system OS 220 provides an interface used by various components of the computing device 100 to communicate with each other. Interfaces provided by the virtualization system OS 220 are used for communication between the trusted OS 134 and the hypervisor 222 in which the trusted OS 134 executes, communication between the server VM 130 and the trusted OS 134, and communication between the trusted key management application 128 and the trusted key store 136. The trusted key management application 128 generates and maintains a trusted-side key metadata table 126 that includes metadata describing cryptographic keys 270. The keys 270 are stored in a trusted key store 136, which can be a database or other data structure in which the keys 270 are stored. The trusted key store 136, which includes the keys 270, is stored in the secure memory region 152 of memory 116. The trusted key management application 128 can generate the keys 270 at suitable times, e.g., when the trusted key management application 128 initializes, and/or as keys are requested by key load requests 212. The trusted key management application 128 stores the generated keys 270 in the secure memory region 152.

The cryptographic keys 270 are stored in the secure memory region 152 of memory 116, but memory 116 can be a volatile memory that does not retain contents when power is lost or switched off. To preserve the cryptographic keys 270 when power is not being provided to the memory 116, the cryptographic keys 270 can be stored persistently in secure non-volatile memory 156 as non-volatile cryptographic keys 272. The trusted key management application 128 can copy the cryptographic keys 270 to the secure non-volatile memory 156 to form the non-volatile cryptographic keys 272. Upon a restart or restoration of power to the computing device 100, the trusted key management application 128 loads the non-volatile cryptographic keys 272 into the trusted key store 136 in memory 116. The trusted key management application 128 then accesses the cryptographic keys 270 stored in the trusted key store 136. Alternatively or additionally, the cryptographic keys 270 can be stored persistently on storage 114. The cryptographic keys 270 can themselves be encrypted using a suitable encryption key when stored persistently in secure non-volatile memory 156 and/or storage 114.

Processor 102 includes a TEE that provides secure execution of operations and secure storage of data. The TEE can protect data from being accessed and/or modified by unauthorized entities such as malicious or unauthorized program code. The TEE 228 can use Arm® TrustZone® technology or other TEE, for example. To provide the TEE, processor 102 includes a security state indicator 154 that indicates whether processor 102 is executing in a non-secure state or a secure state. Program code executing when the processor 102 is in the secure state executes in the TEE. Program code executing when the processor 102 is in the non-secure state does not execute in the TEE but instead executes in a non-trusted execution environment. The non-trusted execution environment is also referred to herein as a "rich execution environment" (REE). Processor 102 switches between the non-secure state and the secure state in response to certain operations, such as changing an exception level or executing a certain processor instruction.

In the secure state, program code instructions executed by processor 102 can access both the non-secure memory region 150 and the secure memory region 152. Program code that executes in the secure state includes trusted OS 134 and trusted key management application 128. Data and/or program code instructions stored in the secure memory region 152 include trusted OS 134, trusted-side key metadata table 126, trusted key management application 128, and trusted key store 136. Processor 102 also restricts interactions between program code executing in the secure state and program code executing in the non-secure state, and provides other security features in the secure state.

In the non-secure state, instructions executed by processor 102 can access non-secure memory region 150 but are prevented (e.g., by processor 102) from accessing secure memory region 152. Program code that executes in the non-secure state and is prevented from accessing the secure memory region 152 includes guest VM 122, server VM 130, user application 124, and secure engine server 132. Data and/or program code instructions stored in non-secure memory region 150 include guest VM 122 user application 124, server VM 130, secure engine server 132, plaintext data 138, encrypted data 140, and server-side key metadata table 142. User application 124 is referred to herein as a "virtualized application" because it executes in a guest VM 122.

The secure engine server 132, which executes in the non-secure state of processor 102, uses key metadata to perform cryptography-related operations as described herein. However, the trusted-side key metadata table 126 is stored in the secure memory region 152 by the trusted key management application 128, so the trusted-side key metadata table 126 is not readable by the secure engine server 132. Thus, the trusted key management application 128 sends at least a portion of the trusted-side key metadata table 126 to the secure engine server 132, which stores the received key metadata in the server-side key metadata table 142. Accordingly, the server-side key metadata table 142 is a copy or replica of at least a portion of the trusted-side key metadata table 126. For example, the server-side key metadata table 142 can include a copy of each row of the trusted-side key metadata table 126. The secure engine server 132 can then use the key metadata available in server-side key metadata table 142 to perform cryptography-related operations, as described herein. In various embodiments, the secure engine server 132 does not use one or more of the columns of the trusted-side key metadata table 126. Thus, data that is not relevant to the secure engine server 132 can be omitted from the server-side key metadata table 142, and need not be sent from the trusted key management application 128 to the secure engine server 132. For example, if the secure engine server 132 does not use the static key identifier 314, then the static key identifier 314 column need not be stored in the server-side key metadata table 142. As another example, if the secure engine server 132 does not enforce key expiration times, then the key expiration time 312 column need not be stored in the server-side key metadata table 142. Further, if certain rows of the trusted-side key metadata table 126 are not relevant to a particular secure engine server 132, then the non-relevant rows need not be sent to the secure engine server 132 and stored in the server-side key metadata table 142. For example, if the secure engine server 132 is not responsible for handling handle requests for certain keys, guest VMs, and/or applications for load balancing reasons, then rows of the trusted-side key metadata table 126 that reference the non-handled keys, guest VMs, and/or applications need not be stored in the server-side key metadata table 142.

The secure engine server 132 receives cryptographic operation requests 216 from user application(s) 124 and invokes a security engine 118 to perform the requested cryptographic operations. Security engine 118 includes hardware components such as a cryptographic accelerator that perform cryptographic operations efficiently with low latency, for example. The cryptographic operations are performed on input data stored in memory 116 that is accessible to the secure engine server 132 and/or to the user application 124. For example, the plaintext data 138 and encrypted data 140 used in encryption or decryption operations can be in a region of memory 116 that is memory-mapped to an address space of security engine 118. Security engine 118 uses cryptographic keys 270 stored in registers or memory locations, referred to herein as key slots 120, as input to the cryptographic operations. In some embodiments, the key slots 120 are accessible by program code executing while the processor 102 is in the secure state, and are not accessible by program code executing while the processor 102 is in the non-secure state. For example, the trusted key management application 128, which executes in the secure state, can load cryptographic keys 270 into the key slots 120. The guest VM 122 and server VM 130, which execute in the non-secure state, are prevented from accessing the key slots.

Prior to performing a cryptographic operation, the trusted key management application 128 loads a designated cryptographic key 270 into a key slot 120. The key slot 120 containing the designated key is then specified as an input parameter to the cryptographic operation. The number of key slots 120 can be less than the number of keys 270, so a key is loaded into a key slot prior to invoking a cryptographic operation if the key is not already in a key slot 120. The cryptographic operations provided by the cryptographic system include an encryption operation that encrypts specified data using a specified cryptographic key 270, a decryption operation that decrypts specified data using a specified key, and message authentication code (MAC) operations that generate and verify MACs on specified data using specified cryptographic keys 270. Other types of cryptographic operations are within the scope of the disclosure.

The cryptographic operations convert input data, which the operation reads from memory 116, to output data, which the operation writes to memory 116. For example, an encryption operation reads plaintext data 138 from memory 116 and encrypts the plaintext data 138 using a key from a given key slot 120 to form encrypted data 140 in memory 116. Conversely, as another example, a decryption operation reads encrypted data 140 from memory 116 and decrypts the encrypted data 140 using a key from a given key slot to form plaintext data 138 in memory 116. Other cryptographic operations, such as MAC verification, read input data from memory 116 and generate a result, e.g. true or false, which can be stored in memory 116.

Figure 2:
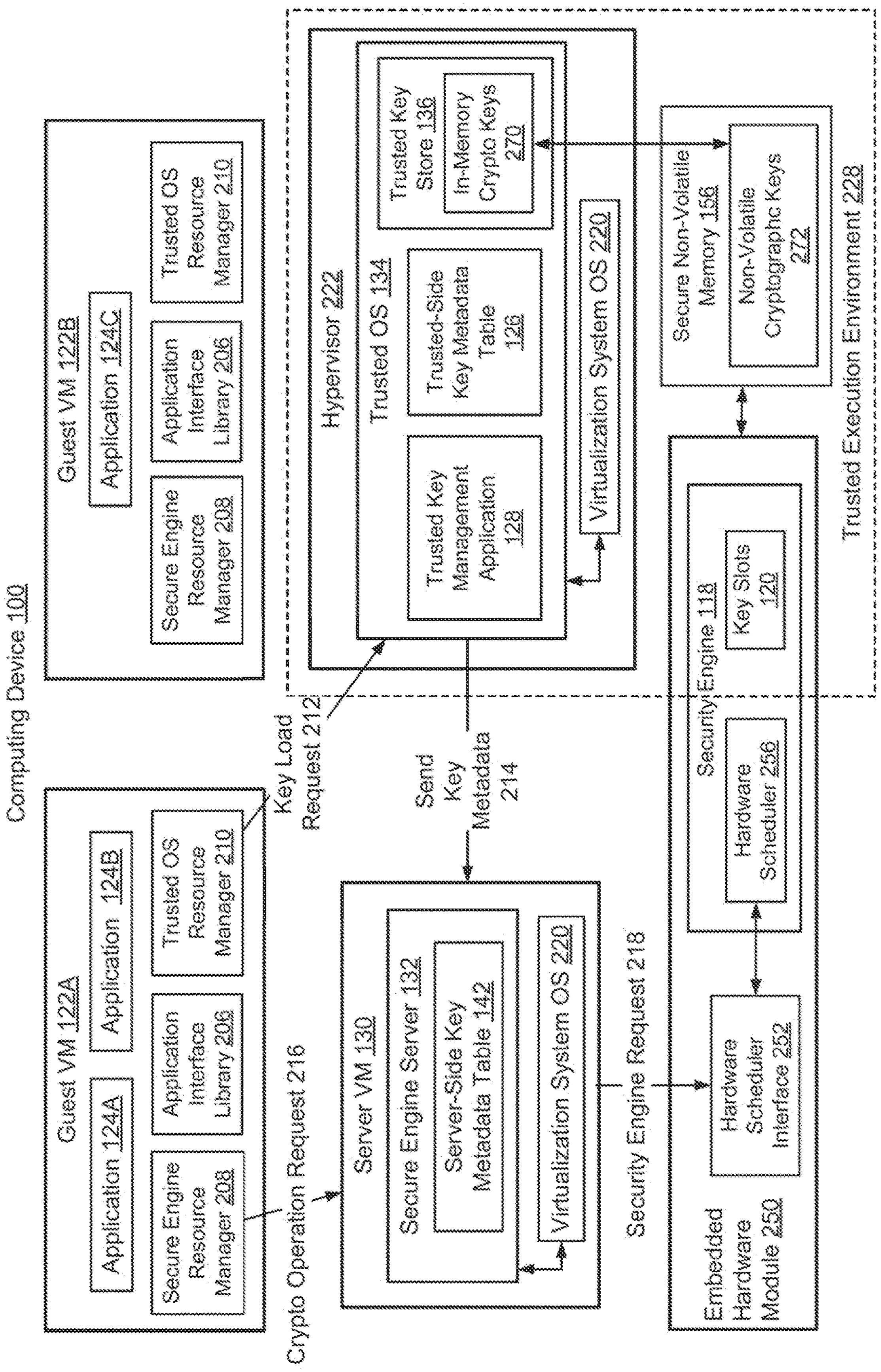
FIG. 2 illustrates a secure engine server that uses encryption keys managed by a trusted operating system to perform secure cryptographic operations, according to various embodiments.

FIG. 2 illustrates a secure engine server 132 that uses encryption keys 270 managed by a trusted OS 134 to perform secure cryptographic operations, according to various embodiments. A user application 124 executing on a guest VM 122 invokes an application interface library 206 to perform cryptographic operations. The user application 124 invokes the application interface library 206 using procedure calls, for example. The application interface library 206 provides invocable cryptographic procedures that communicate with a secure engine resource manager 208 and a trusted OS resource manager 210 to cause requests 212, 216 to be sent to a hypervisor 222 and a server VM 130, respectively, to perform cryptographic operations.

The user application 124 and application interface library 206 can execute in a guest VM 122 managed by a hypervisor 222. The application interface library 206 includes resource managers 208, 210, which serialize cryptographic operation invocations from user application(s) 124 and send key load requests 212 to the secure engine server 132 and cryptographic operation requests 216 to the trusted key management application 128 as described herein. Each resource manager 208, 210 serializes cryptographic operation invocations into a sequential order, so that if two or more cryptographic operation invocations from an application(s) overlap in time (e.g., are made at the same time), the corresponding operation requests are sent sequentially. Sending the operation requests sequentially can involve waiting for each operation request in the sequential order to be completed prior to sending another operation request. Operation requests 212, 214, 216, 218 and their respective responses are sent between components via inter-VM communication (IVC), which uses shared memory that is accessible by the sender and receiver. The sender and receiver can be different VMs, or a VM and a hypervisor.

A trusted key management application 128 resides in a TEE 228 and manages cryptographic keys 270 ("managed keys"). The trusted key management application 128 can be a secure application that executes on the hypervisor 222 in the TEE 228, manages the key store 136, loads keys into key slots 120 in response to key load requests, and notifies the secure engine server 132 when keys are loaded into key slots 120. The trusted key management application 128 generates cryptographic keys 270 upon, for example, receiving requests to generate keys from guest VM 122 and/or upon being initialized. The trusted key management application 128 stores the cryptographic keys 270 using a trusted key store 136, which can store the keys 270 in a database or other data structure. The trusted key management application 128 and/or the trusted key store 136 can store the leys 270 in secure non-volatile memory 156 as non-volatile cryptographic keys 272. The trusted key management application 128 and/or trusted-side key metadata table 126 can retrieve the keys 272 from the trusted key store 136 as needed. The secure non-volatile memory 156 is accessible in the TEE 228 but is not accessible outside the TEE 228. The trusted key management application 128 and/or the trusted key store 136 encrypt and authenticate the non-volatile cryptographic keys 272 using other cryptographic keys referred to herein as trusted keys (not shown). The authentication can be performed by verifying a Message Authentication Code computed for each key 272 using a trusted key, for example. Components of computing device 100 and/or program code executing outside the TEE 228 are prevented from accessing the contents of the secure non-volatile memory 156, including the non-volatile cryptographic keys 272, by hardware mechanisms of the computing device 100 to prevent the keys 272 from being decrypted or modified without proper authorization. Alternatively or additionally, the trusted key management application 128 can store the trusted key store 136 in storage 114 in an encrypted form. The trusted key management application 128 can retrieve the encrypted keys from the storage 114 and decrypt the encrypted keys using a suitable cryptographic key 270 as needed.

FIG. 3 illustrates key metadata tables, according to various embodiments. Key metadata is stored in a trusted-side key metadata table 126, which is generated by a trusted key management application 128 executing in a trusted OS 134 in a TEE 228. At least a portion of the trusted-side key metadata table 126 is sent to the secure engine server 132 and stored in a non-secure memory region 150 as a server-side key metadata table 142 for use by the secure engine server 132.

The trusted key management application 128 generates the trusted-side key metadata table 126 and sends at least a portion of the trusted-side key metadata table 126 to the secure engine server 132 via a send key metadata 214 communication, which can be an inter-VM communication. The send key metadata 214 communication can be performed in response to a key load request 212 from a user application 124 or at other suitable time. The secure engine server 132 receives the key metadata and copies the received key metadata to a server-side key metadata table 142. The trusted key management application 128 propagates subsequent changes made to the trusted-side key metadata table 126 to the server-side key metadata table 142 via additional send key metadata 214 communications.

The trusted-side key metadata table 126 includes a row for each existing key. The existing keys can be generated by the trusted key management application 128 in an initialization phase, for example. For each existing key, the key metadata table 126 includes the following stored data items: a key slot identifier 302 of a key slot into which the key is loaded (if any), a guest VM ID 304 of a guest VM 122 using the key (if any), an application ID 306 of an application using the key (if any), an ephemeral key identifier 308 associated with the key, a list of allowed operations 310, which lists cryptographic operations that the application 124 (or guest VM 122) is allowed to perform using the key, a key expiration time 312 indicating a time at which the key expires, and a static key identifier 314 that can be used to identify the key. The static key identifier 314 can be used to identify the key prior to assignment of an ephemeral key identifier 308 to the key, for example. The trusted-side key metadata table 126 can include additional cryptography parameters (not shown) for each key, such as the length of the key, the type of encryption supported by the key, e.g., symmetric or asymmetric, encryption mode (e.g. cipher-block chaining (CBC), a specific encryption algorithm such as Advanced Encryption Standard (AES), and so on. The allowed operations 310 specify one or more of the cryptography parameters to indicate that the key is only to be used for cryptography operations having the specified parameter (s). For example, if the allowed operations 310 in a table row specify "AES CBC" then the key associated with the table row (e.g., the key identified by the ephemeral key identifier 308 in the table row) is restricted to being used only with AES CBC cryptographic operations.

In the example trusted-side key metadata table 126, metadata for a first key is stored in a first record represented by first row, which contains key slot identifier KS-1, guest VM ID VM-1, application ID App-1, ephemeral key identifier EK-1, allowed operations "encrypt" and "decrypt," key expiration time 312 Time-1, and static key identifier 314 Key-1. Metadata for a second key is stored in a second record represented by a second row, which contains key slot identifier KS-2, guest VM ID VM-1, application ID App-2, ephemeral key identifier EK-2, allowed operations "CBC AES Encrypt" and "Generate MAC," key expiration time 312 Time-2, and static key identifier 314 Key-2. Metadata for a third key is stored in a third record represented by a third row, which contains key slot identifier KS-3, guest VM ID VM-2, application ID App-3, ephemeral key identifier EK-3, allowed operations "CBC AES Decrypt" and "Verify MAC," key expiration time 312 Time-3, and static key identifier 314 Key-3. Although the metadata columns in the trusted-side key metadata table 126, such as the key slot identifier 302, guest VM ID 304, and so on, are shown in a single key metadata table 126 in the example of FIG. 3, the metadata items can alternatively or additionally be stored in two or more tables. For example, the association between the key slot identifier 302 and the guest VM ID 304 can be stored in a separate table, in which case the guest VM ID 304 need not be included in the trusted-side key metadata table 126.

Returning back to FIG. 2, prior to requesting that a cryptographic operation be performed, the user application 124 selects a cryptographic key 270 to be used in one or more subsequent cryptographic operations and invokes a key load operation that loads the selected key into a key slot 120. Each cryptographic key 270 is associated with a static key identifier that can be used to identify the key 270. The trusted key management application 128 can send the static key identifiers 314 and associated cryptography parameters for each static key identifier 314 to the user application 124. The cryptography parameters can include a type of encryption (e.g., symmetric or asymmetric), a desired key length, and/or other cryptography parameters as described herein. The user application 124 receives the cryptography parameters associated with each static key identifier from the trusted key management application 128. The user application 124 can select one of the static key identifiers based on parameter values of the desired cryptographic to be performed.

The user application 124 provides the selected static key identifier to the application interface library 206, e.g., as an input parameter of the key loading operation. The user application 124 then invokes a key loading operation provided by the application interface library 206 to cause the trusted key management application 128 to load the key 270 identified by the static key identifier to be loaded into a key slot 120. In response to the invocation of the key loading operation, the application interface library 206 causes the trusted OS resource manager 210 to send a key load request 212 to the trusted key management application 128 executing on the trusted OS 134. The key load request 212 includes the static identifier of the cryptographic key 270, and is a request to load the identified cryptographic key 270 into a key slot 120 in the TEE 228. The trusted OS resource manager 210 can send the key load request 212 to the trusted key management application 128 using inter-VM communication.

Upon receiving the key load request 212 from the guest VM 122, the trusted key management application 128 identifies the cryptographic key 270 associated with the static key identifier specified in the key load request 212. For example, the cryptographic key 270 can be identified by searching the trusted-side key metadata table 126 for a record having a stored static key identifier 314 that matches the static key identifier specified in the key load request 212. The non-volatile key metadata can associate a static key identifier with each of the cryptographic keys 270, so the trusted key management application 128 can identify the cryptographic key 270 associated with the static identifier by searching the trusted-side key metadata table 126 for the static identifier. If the key metadata indicates that the identified key 270 is not in a key slot 120, the trusted key management application 128 identifies a particular key slot 120 in the set of key slots 120 using a suitable selection policy, and loads the identified key 270 into the identified key slot 120. In various embodiments, if there are no empty key slots 120 when a key load request 212 is received, the trusted key management application 128 does not perform the key load request 212. The trusted key management application 128 does not replace a key in a key slot that is in use. Instead, the trusted key management application 128 replaces keys that the trusted key management application 128 has indicated are no longer needed, e.g., by sending a delete or discard request to release a key from a key slot. Keys are thus kept in key slots so that the user application 124 can continue to use the keys without verifying that the keys are still in the key slots.

Further, in response to receiving the key load request 212, the trusted key management application 128 generates an ephemeral key identifier 308 that identifies the cryptographic key 270. The ephemeral key identifier 308 is to be used by the user application 124 that sent the key load request 212. The ephemeral key identifier 308 can be a random value, for example. The size of the ephemeral key identifier 308 can be based on the size of the cryptographic key 270 that the ephemeral key identifier 308 represents. The trusted key management application 128 stores an association between the key slot identifier of the key slot 120 and the ephemeral key identifier 308 in the trusted-side key metadata table 126. The trusted key management application 128 then sends the ephemeral key identifier 308 to the secure engine server 132 located on the server VM 130, e.g., as part of a send key metadata 214 communication. The trusted key management application 128 also sends the ephemeral key identifier 308 to the application interface library 206 located on the guest VM 122 as a response to the key load request 212. The application interface library 206 on the guest VM 122 subsequently specifies the ephemeral key identifier 308 in one or more cryptographic operation requests 216 to indicate that the cryptographic key 270 associated with the ephemeral key identifier 308 is to be used in requested cryptographic operations.

To request a cryptographic operation, the user application 124 invokes the application interface library 206 using parameters that identify the operation (e.g., a specific encryption algorithm, such as a public-key encryption algorithm or a symmetric encryption algorithm such as CBC AES encryption), the memory location and size of data to be encrypted (e.g., plaintext data 138) or decrypted (e.g., encrypted data 140). The user application 124 need not specify the ephemeral key identifier 308, since the application interface library 206 can maintain the ephemeral key identifier 308 ephemeral key identifier previously received by the guest VM 122 for the user application 124 (in response to a previous key load request 212) and provide the ephemeral key identifier 308 to the secure engine resource manager 208. A secure engine resource manager 208 receives the invocation from the application via the application interface library 206 and sends a corresponding cryptographic operation request 216 to the secure engine server 132, e.g., as an inter-VM communication. The cryptographic operation request 216 specifies the cryptographic operation to be performed, the location (e.g., memory address) of the data on which the operation is to be performed, and the ephemeral key identifier 308 received from the trusted key management application 128. The request further includes an ephemeral key identifier previously received by the guest VM 122 for the particular user application 124 that invokes the cryptographic operation.

Upon receiving a cryptographic operation request 216, the secure engine server 132 identifies the guest VM 122 that sent the cryptographic operation request 216, verifies the request by verifying that the guest VM 122 and/or user application 124 has permission to use the cryptographic key specified in the cryptographic operation request 216, and further verifying that the guest VM 122 and/or user application 124 has permission to perform the requested cryptographic operation according to the allowed operations 310 associated with the key specified in the cryptographic operation request 216. If both verifications are successful, the secure engine server 132 requests the security engine 118 to perform the requested cryptographic operation.

To identify the guest VM 122 that sent the cryptographic operation request 216, the secure engine server 132 uses a channel mapping table that associates IVC channels with guest VMs 122. The channel mapping table can be statically configured and used to establish an IVC channel between each guest VM 122 and the server VM 130 for use in sending cryptographic operation requests 216. The channel mapping table can also be used to establish other IVC channels, such as an IVC channel between each guest VM 122 and the hypervisor 222 for use in sending key load requests 212, and an IVC channel between the hypervisor 222 and the server VM 130 for use in send key metadata 214 communications. The IVC channels can be established when the computing device 100 starts the guest VMs 122.

An example channel mapping table for the example configuration of FIG. 2 includes a record that associates the guest VM 122A with a channel identifier of an inter-VM communication channel established between the guest VM 122A and the server VM 130. The example channel mapping table also includes a record that associates the guest VM 122B with a channel identifier of a channel established between the guest VM 122B and the server VM 130. The secure engine server 132 identifies a VM identifier ("VM ID") of the guest VM 122 that sent the cryptographic operation request 216 by searching the channel mapping table for a record having a stored channel identifier that matches (e.g., is equal to) the channel identifier of the inter-VM communication channel on which the cryptographic operation request 216 was received. If such a record is found in the channel mapping table, then the record indicates the VM ID of the guest VM from which the cryptographic operation request 216 was received.

To verify that the guest VM 122 from which the cryptographic operation request 216 was received has permission to use the cryptographic key specified in the cryptographic operation request 216, the secure engine server 132 identifies (e.g., searches for) in the server-side key metadata table 142 a key metadata record having a stored ephemeral key identifier 308 that matches (e.g., is equal to) the ephemeral key identifier specified in the cryptographic operation request 216 and further having a guest VM ID 304 that matches the VM ID of the guest VM 122 from which the cryptographic operation request 216 was received. If such a matching key metadata record is found in the server-side key metadata table 142, then the guest VM 122 from which the cryptographic operation request 216 was received has permission to use the cryptographic key specified in the cryptographic operation request 216.

Otherwise, if a matching key metadata record is not found, the guest VM 122 from which the cryptographic operation request 216 was received does not have permission to use the cryptographic key specified in the cryptographic operation request 216. Accordingly, the secure engine server 132 sends an error indication to the guest VM 122 and stops processing the security engine request 218 because of the lack of permission to use the key. In one example, a guest VM 122 that has permission to use a key can be, for example, an owner (e.g., creator) of the key. In another example, a guest VM 122 can be granted permission to use a key by the owner of the key or by a key management component, such as the trusted key management application 128.

The cryptographic operation request 216 can also specify an application identifier, in which case the secure engine server 132 includes the application identifier in the search criteria. That is, the secure engine server 132 searches the server-side key metadata table 142 for a key metadata record having an ephemeral key identifier 308 that matches the ephemeral key identifier specified in the cryptographic operation request 216, further having a guest VM ID 304 that matches the VM ID of the guest VM 122 from which the cryptographic operation request 216 was received, and still further having an application ID 306 that matches the application identifier specified in the cryptographic operation request 216. In this way the secure engine server 132 verifies that the guest VM 122 and the user application 124 have permission to use the cryptographic key specified in the cryptographic operation request 216. If a matching key metadata record is found in the server-side key metadata table 142, then the guest VM 122 from which the cryptographic operation request 216 was received and the user application 124 have permission to use the cryptographic key specified in the cryptographic operation request 216. Otherwise, if no such matching key metadata record is found, then the guest VM 122 from which the cryptographic operation request 216 was received and/or the user application 124 do not have permission to use the cryptographic key specified in the cryptographic operation request 216. Accordingly, if the guest VM 122 and/or the user application 124 do not have permission, the secure engine server 132 sends an error indication to the guest VM 122 and stops processing the security engine request 218.

To verify that the guest VM 122 and/or user application 124 from which the cryptographic operation request 216 was received has permission to perform the requested cryptographic operation according to the allowed operations 310 associated with the key specified in the request, the secure engine server 132 determines whether the requested cryptographic operation is included in the allowed operations 310 of the matching key metadata record. For example, if the requested cryptographic operation is "CBC AES Encrypt" and the key specified in the request has an ephemeral key identifier 308 of "EK-1" then the guest VM 122 has permission to perform the requested cryptographic operation because the allowed operations 310 ("Encrypt, Decrypt") for the key EK-1 include "Encrypt", which indicates that the key EK-1 has permission to perform any encryption operation. In a similar example, if the key specified in the request has an ephemeral key identifier 308 of "EK-2" then the guest VM 122 has permission to perform the requested cryptographic operation because the allowed operations 310 ("CBC AES Encrypt, Generate MAC") for the key EK-2 include CBC AES Encrypt. However, in another example, if the key specified in the request has an ephemeral key identifier 308 of "EK-3" then the guest VM 122 does not have permission to perform the requested cryptographic operation because the allowed operations 310 ("CBC AES Decrypt, Verify MAC") for EK-3 do not include an encryption operation. If the cryptographic operation request 216 specifies an application identifier, then the user application 124 identified by the application identifier also has permission to perform the requested cryptographic operation because the matching key metadata record has an application ID 306 that matches the specified application identifier.

Upon successfully verifying the request by verifying that the guest VM 122 and/or user application 124 has permission to use the specified cryptographic key and further verifying that the guest VM 122 and/or user application 124 has permission to perform the requested cryptographic operation, the secure engine server 132 identifies the key slot identifier 302 that corresponds to the ephemeral key identifier 308 received in the cryptographic operation request 216. The secure engine server 132 identifies the key slot identifier in the matching key metadata record, which contains the received ephemeral key identifier 308. The secure engine server 132 retrieves the key slot identifier associated with the ephemeral key identifier 308 from the matching key metadata record and submits the requested cryptographic operation, including the key slot identifier, to the security engine 118.

The secure engine server 132 submits the requested cryptographic operation to the security engine 118 via a hardware scheduler interface 252, which sends the operation to a hardware scheduler 256 that is included in the security engine 118. For example, the hardware scheduler interface 252 adds the cryptographic operation request to a queue of operations to be performed by the security engine 118. The hardware scheduler 256 deques the operation request from the queue and performs the operation specified by the operation request. The security engine 118 reads input data (e.g., plaintext data 138 or encrypted data 140) stored in memory 116 that is accessible to the application 124, performs the cryptographic operation, which writes output data to the encrypted data 140 or plaintext data 138, and notifies the secure engine server 132 upon completing the operation. For example, if the operation is an encryption operation, the security engine 118 encrypts plaintext data 138 at a memory location specified in the operation request and stores the encrypted data 140 at a destination memory location. The destination memory location can be specified by the operation request or determined by the security engine 118. The secure engine server 132 then sends a cryptographic operation response (which is a response to the cryptographic operation request 216) to the secure engine resource manager 208 in the guest VM 122 via inter-VM communication. The cryptographic operation response includes results of the cryptographic operation, such as a memory address and/or length of the encrypted data 140 in the case of an encryption operation. The secure engine resource manager 208 provides the results from the response to the application interface library 206, which provides the results to the user application 124 as a response to the invocation of the cryptographic operation made by the user application 124.

Figure 4:
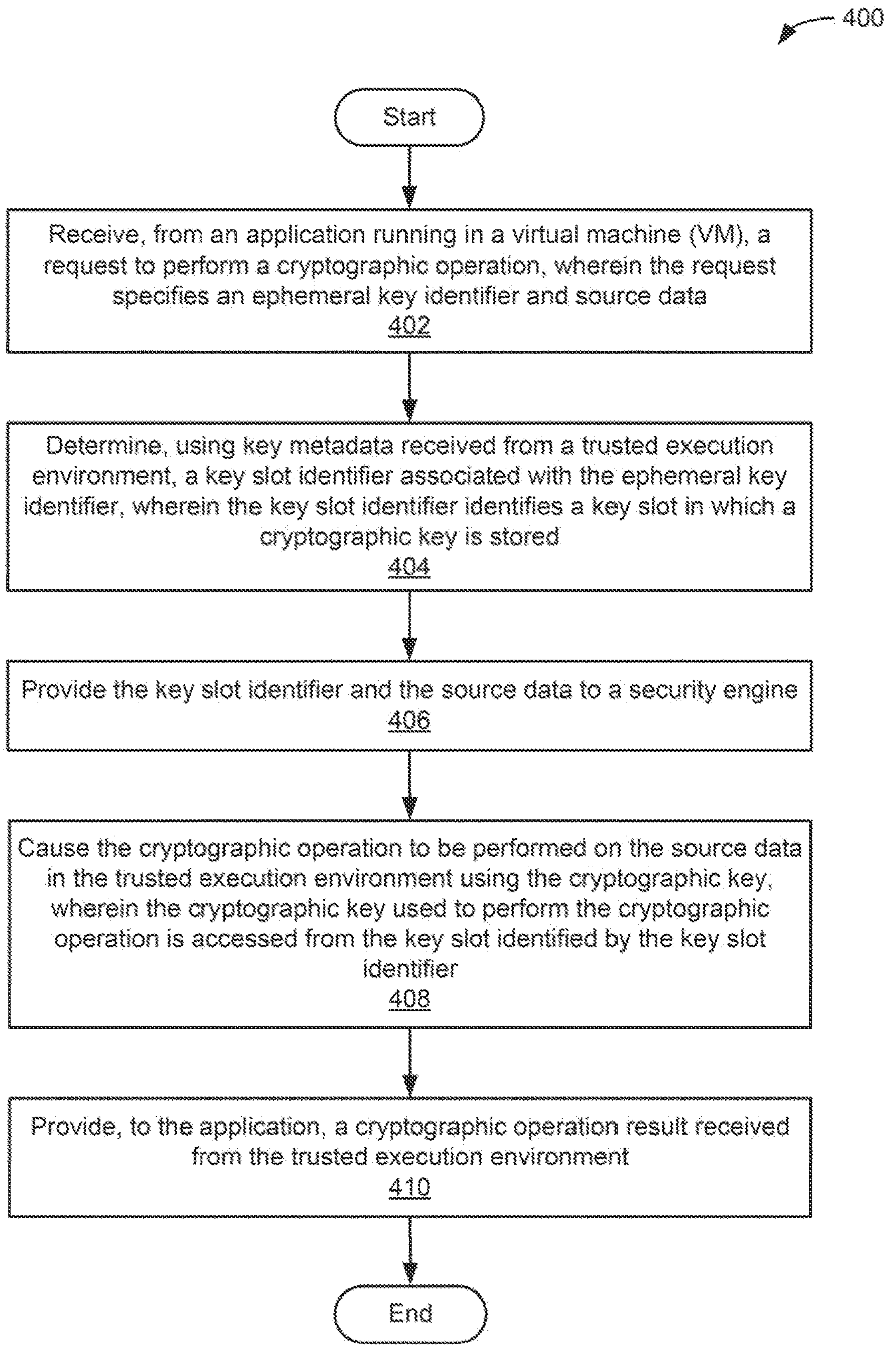
FIG. 4 illustrates a flow diagram of a method for providing cryptographic operations to virtualized applications in a rich execution environment using keys that are managed by a trusted operating system in a trusted execution environment, according to various embodiments.

Now referring to FIG. 4, each block of method 400, described herein, comprises a computing process that can be performed using any combination of hardware, firmware, and/or software. For instance, various functions can be carried out by a processor executing instructions stored in memory. The method can also be embodied as computer-usable instructions stored on computer storage media. The method can be provided by a standalone application, a service or hosted service (standalone or in combination with another hosted service), or a plug-in to another product, to name a few. In addition, method 400 is described, by way of example, with respect to the system of FIGS. 1-3. However, this method can additionally or alternatively be executed by any one system, or any combination of systems, including, but not limited to, those described herein. Further, the operations in method 400 can be omitted, repeated, and/or performed in any order without departing from the scope of the present disclosure.

FIG. 4 illustrates a flow diagram of a method for providing cryptographic operations to virtualized applications 124 in a rich execution environment using keys that are managed by a trusted operating system 134 in a TEE 228, according to various embodiments. As shown in FIG. 4, method 400 begins with operation 402, in which a secure engine server 132 receives, from an application running in a virtual machine, a request 216 to perform a cryptographic operation. In various embodiments, without limitation, the cryptographic operation request 216 specifies an ephemeral key identifier 308 and source data. The ephemeral key identifier 308 identifies a cryptographic key 270, and the source data is input data for the cryptographic operation, e.g., plaintext data 138 or encrypted data 140.

In operation 404, secure engine server 132 determines, using key metadata in a server-side key metadata table 142 received from a TEE 228, a key slot identifier 302 associated with the ephemeral key identifier 308. The key slot identifier 302 identifies a key slot 120 in which a cryptographic key is stored. In various embodiments, the key stored in the key slot 120 is loaded into the key slot 120 by a trusted key management application 128. The key slot 120 is in the TEE 228 and is thus not accessible to program code executing outside the TEE 228, such as program code executing in the guest VM 122 or in the server VM 130.

In operation 406, secure engine server 132 provides the key slot identifier 302 and the source data to a security engine 118 that executes in the TEE 228 and can access the key slots 120. In operation 408, secure engine server 132 causes the cryptographic operation to be performed on the source data in the TEE 228 using the cryptographic key, wherein the cryptographic key used to perform the cryptographic operation is accessed from the key slot 120 identified by the key slot identifier 302. In various embodiments, without limitation, the cryptographic key used to perform the cryptographic operation is accessed from the key slot 120 identified by the key slot identifier 302. In various embodiments, without limitation the cryptographic key is accessed in the key slot 120 by the security engine 118. The security engine 118 reads the source data (e.g., plaintext data 138 or encrypted data 140) stored in memory 116 that is accessible to the application 124, performs the cryptographic operation, and notifies the secure engine server 132 upon completing the operation, The security engine 118 executing in the TEE 228 can notify the secure engine server 132 upon completing the operation by sending a cryptographic operation result to the secure engine server 132 via the hardware scheduler interface 252, for example.

In operation 410, secure engine server 132 provides, to the application 124, the cryptographic operation result received from the TEE 228. The cryptographic operation result can be received from the security engine that executes in the TEE 228, for example.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing, and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems implementing one or more language models such as large language models (LLMs) that process text, audio, and/or sensor data, systems for performing light transport simulation, systems for performing collaborative content creation for 3D assets, systems implemented at least partially using cloud computing resources, and/or other types of systems.

Example Autonomous Vehicle

Figure 5A:
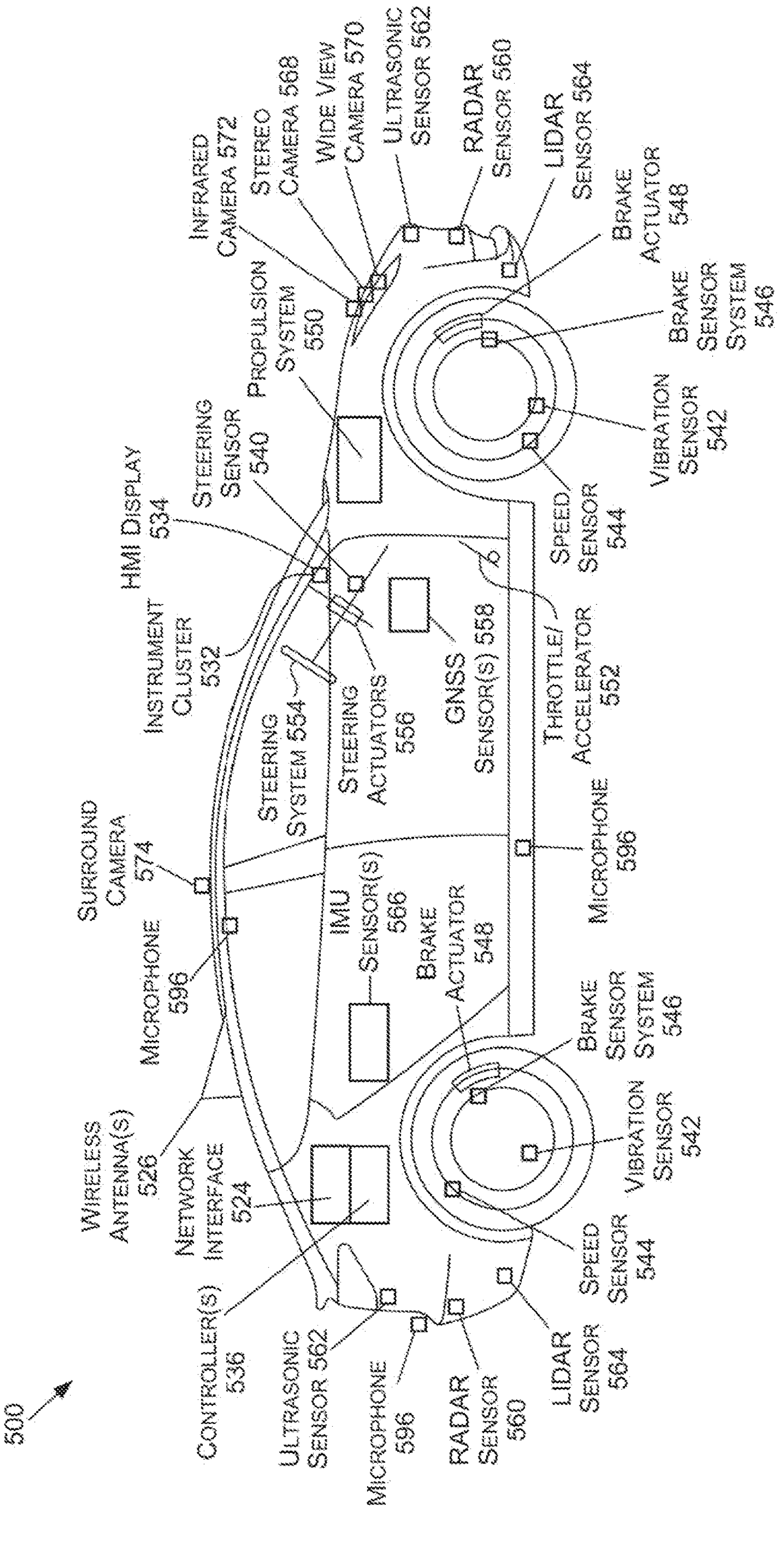
FIG. 5A is an illustration of an example autonomous vehicle, in accordance with some embodiments of the present disclosure.

FIG. 5A is an illustration of an example autonomous vehicle 500, in accordance with some embodiments of the present disclosure. The autonomous vehicle 500 (alternatively referred to herein as the "vehicle 500") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 500 may be capable of functionality in accordance with one or more of Level 3-Level 5 of the autonomous driving levels. The vehicle 500 may be capable of functionality in accordance with one or more of Level 1-Level 5 of the autonomous driving levels. For example, the vehicle 500 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 500 or other machine. such as being fully autonomous, being highly autonomous, being conditionally autonomous, being partially autonomous, providing assistive autonomy, being semi-autonomous, being primarily autonomous, or other designation.

The vehicle 500 may include components such as a chassis, a vehicle body, wheels (e.g., 2, 4, 6, 8, 18, etc.), tires, axles, and other components of a vehicle. The vehicle 500 may include a propulsion system 550, such as an internal combustion engine, hybrid electric power plant, an all-electric engine, and/or another propulsion system type. The propulsion system 550 may be connected to a drive train of the vehicle 500, which may include a transmission, to enable the propulsion of the vehicle 500. The propulsion system 550 may be controlled in response to receiving signals from the throttle/accelerator 552.

A steering system 554, which may include a steering wheel, may be used to steer the vehicle 500 (e.g., along a desired path or route) when the propulsion system 550 is operating (e.g., when the vehicle is in motion). The steering system 554 may receive signals from a steering actuator 556. The steering wheel may be optional for full automation (Level 5) functionality.

The brake sensor system 546 may be used to operate the vehicle brakes in response to receiving signals from the brake actuators 548 and/or brake sensors.

Controller(s) 536, which may include one or more system on chips (SoCs) 504 (FIG. 5C) and/or GPU(s), may provide signals (e.g., representative of commands) to one or more components and/or systems of the vehicle 500. For example, the controller(s) may send signals to operate the vehicle brakes via one or more brake actuators 548, to operate the steering system 554 via one or more steering actuators 556, to operate the propulsion system 550 via one or more throttle/accelerators 552. The controller(s) 536 may include one or more onboard (e.g., integrated) computing devices (e.g. supercomputers) that process sensor signals, and output operation commands (e.g., signals representing commands) to enable autonomous driving and/or to assist a human driver in driving the vehicle 500. The controller(s) 536 may include a first controller 536 for autonomous driving functions, a second controller 536 for functional safety functions, a third controller 536 for artificial intelligence functionality (e.g., computer vision), a fourth controller 536 for infotainment functionality, a fifth controller 536 for redundancy in emergency conditions, and/or other controllers. In some examples, a single controller 536 may handle two or more of the above functionalities, two or more controllers 536 may handle a single functionality, and/or any combination thereof.

The controller(s) 536 may provide the signals for controlling one or more components and/or systems of the vehicle 500 in response to sensor data received from one or more sensors (e.g., sensor inputs). The sensor data may be received from, for example and without limitation, global navigation satellite systems ("GNSS") sensor(s) 558 (e.g., Global Positioning System sensor(s)), RADAR sensor(s) 560, ultrasonic sensor(s) 562, LIDAR sensor(s) 564, inertial measurement unit (IMU) sensor(s) 566 (e.g., accelerometer (s), gyroscope(s), magnetic compass(es), magnetometer(s), etc.), microphone(s) 596, stereo camera(s) 568, wide-view camera(s) 570 (e.g., fisheye cameras), infrared camera(s) 572, surround camera(s) 574 (e.g., 360 degree cameras), long-range and/or mid-range camera(s) 598, speed sensor(s) 544 (e.g. for measuring the speed of the vehicle 500), vibration sensor(s) 542, steering sensor(s) 540, brake sensor (s) (e.g., as part of the brake sensor system 546), and/or other sensor types. The controller(s) 536 may include one or more instances of guest VM 122, server VM 130, user application 124, secure engine server 132, trusted OS 134, and/or trusted key management application 128 to perform cryptographic operations.

One or more of the controller(s) 536 may receive inputs (e.g., represented by input data) from an instrument cluster 532 of the vehicle 500 and provide outputs (e.g., represented by output data, display data, etc.) via a human-machine interface (HMI) display 534, an audible annunciator, a loudspeaker, and/or via other components of the vehicle 500. The outputs may include information such as vehicle velocity, speed, time, map data (e.g., the High Definition ("HD") map 522 of FIG. 5C), location data (e.g., the vehicle's 500 location, such as on a map), direction, location of other vehicles (e.g. an occupancy grid), information about objects and status of objects as perceived by the controller(s) 536, etc. For example, the HMI display 534 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 500 further includes a network interface 524 which may use one or more wireless antenna(s) 526 and/or modem(s) to communicate over one or more networks. For example, the network interface 524 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-30/82 CDMA Multi-Carrier ("CDMA2000"), etc. The wireless antenna(s) 526 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 5B:
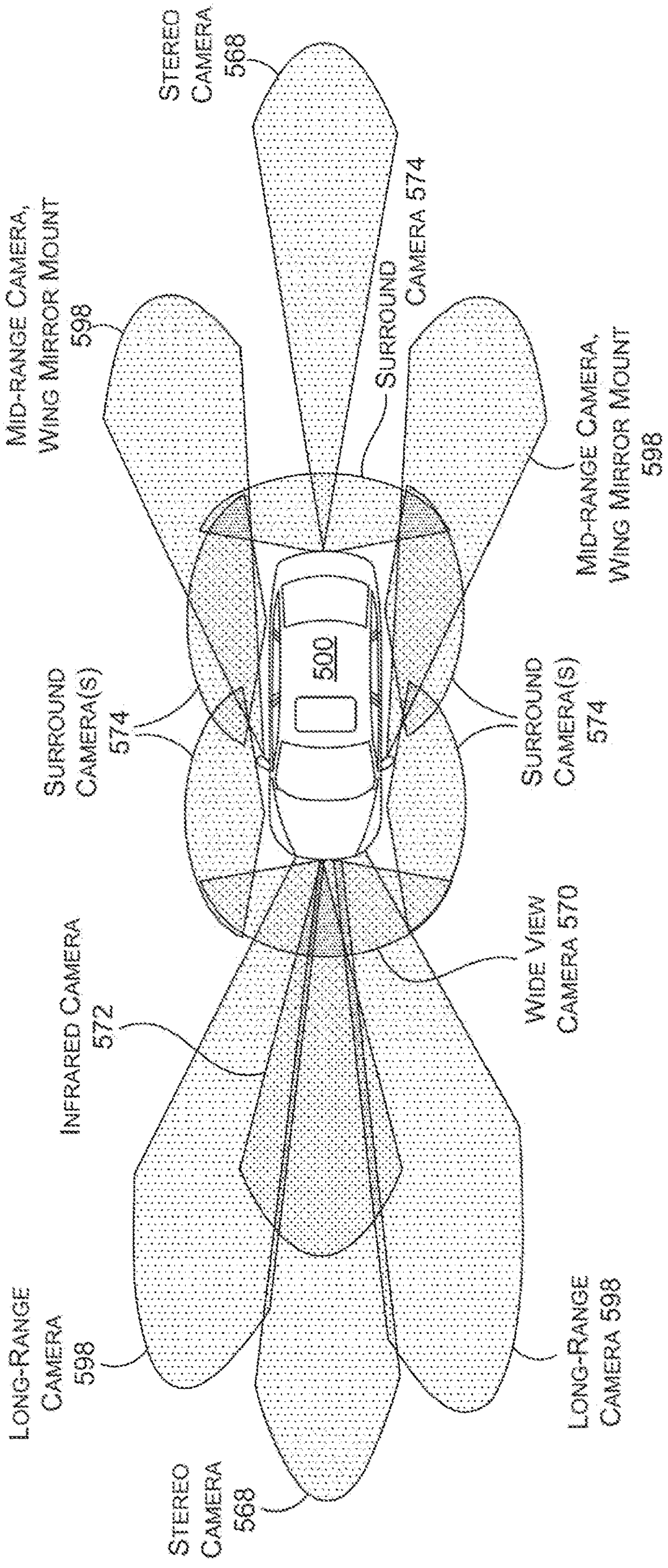
FIG. 5B is an example of camera locations and fields of view for the example autonomous vehicle of FIG. 5A, in accordance with some embodiments of the present disclosure.

FIG. 5B is an example of camera locations and fields of view for the example autonomous vehicle 500 of FIG. 5A, in accordance with some embodiments of the present disclosure. The cameras and respective fields of view are one example embodiment and are not intended to be limiting. For example, additional and/or alternative cameras may be included and/or the cameras may be located at different locations on the vehicle 500.

The camera types for the cameras may include, but are not limited to, digital cameras that may be adapted for use with the components and/or systems of the vehicle 500. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 500 (e.g., front-facing cameras) may be used for surround view, to help identify forward facing paths and obstacles, as well aid in, with the help of one or more controllers 536 and/or control SoCs, providing information critical to generating an occupancy grid and/or determining the preferred vehicle paths. Front-facing cameras may be used to perform many of the same ADAS functions as LIDAR, Iding emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 570 that may be used to perceive objects coming into view from the periphery (e.g., pedestrians, crossing traffic or bicycles). Although only one wide-view camera is illustrated in FIG. 5B, there may be any number (including zero) of wide-view cameras 570 on the vehicle 500. In addition, any number of long-range camera (s) 598 (e.g., a long-view stereo camera pair) may be used for depth-based object detection, especially for objects for which a neural network has not yet been trained. The long-range camera(s) 598 may also be used for object detection and classification, as well as basic object tracking.

Any number of stereo cameras 568 may also be included in a front-facing configuration. In at least one embodiment, one or more of stereo camera(s) 568 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 568 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 568 may be used in addition to, or alternatively from, those described herein.

Cameras with a field of view that include portions of the environment to the side of the vehicle 500 (e.g., side-view cameras) may be used for surround view, providing information used to create and update the occupancy grid, as well as to generate side impact collision warnings. For example, surround camera(s) 574 (e.g. four surround cameras 574 as illustrated in FIG. 5B) may be positioned to on the vehicle 500. The surround camera(s) 574 may include wide-view camera(s) 570, fisheye camera(s), 360 degree camera(s), and/or the like. Four example, four fisheye cameras may be positioned on the vehicle's front, rear, and sides. In an alternative arrangement, the vehicle may use three surround camera(s) 574 (e.g., left, right, and rear), and may leverage one or more other camera(s) (e.g., a forward-facing camera) as a fourth surround view camera.

Cameras with a field of view that include portions of the environment to the rear of the vehicle 500 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 598, stereo camera(s) 568), infrared camera(s) 572, etc.), as described herein.

Figure 5C:
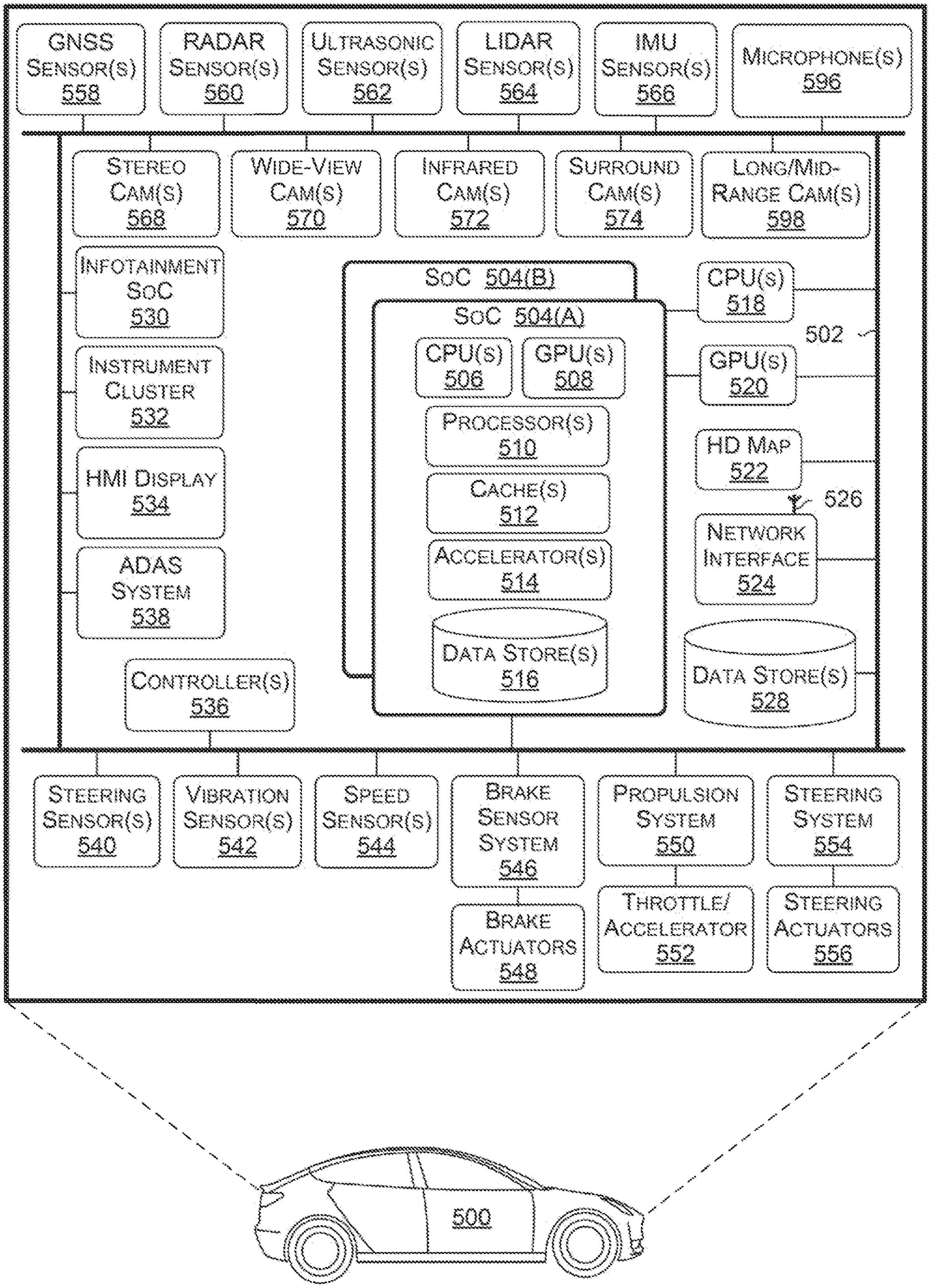
FIG. 5C is a block diagram of an example system architecture for the example autonomous vehicle of FIG. 5A, in accordance with some embodiments of the present disclosure.

FIG. 5C is a block diagram of an example system architecture for the example autonomous vehicle 500 of FIG. 5A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location, Various functions described herein as being performed by entities may be carried out by hardware, firmware, and/or software. For instance, various functions may be carried out by a processor executing instructions stored in memory.

Each of the components, features, and systems of the vehicle 500 in FIG. 5C are Illustrated as being connected via bus 502. The bus 502 may include a Controller Area Network (CAN) data interface (alternatively referred to herein as a "CAN bus"). A CAN may be a network inside the vehicle 500 used to aid in control of various features and functionality of the vehicle 500, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 502 is described herein as being a CAN bus, this is not intended to be limiting. For example, in addition to, or alternatively from, the CAN bus, FlexRay and/or Ethernet may be used. Additionally, although a single line is used to represent the bus 502, this is not intended to be limiting. For example, there may be any number of busses 502, which may include one or more CAN busses, one or more FlexRay busses, one or more Ethernet busses, and/or one or more other types of busses using a different protocol. In some examples, two or more busses 502 may be used to perform different functions, and/or may be used for redundancy. For example, a first bus 502 may be used for collision avoidance functionality and a second bus 502 may be used for actuation control, In any example, each bus 502 may communicate with any of the components of the vehicle 500, and two or more busses 502 may communicate with the same components. In some examples, each SoC 504, each controller 536, and/or each computer within the vehicle may have access to the same input data (e.g., inputs from sensors of the vehicle 500), and may be connected to a common bus, such the CAN bus.

The vehicle 500 may include one or more controller(s) 536, such as those described herein with respect to FIG. SA. The controller(s) 536 may be used for a variety of functions. The controller(s) 536 may be coupled to any of the various other components and systems of the vehicle 500, and may be used for control of the vehicle 500, artificial intelligence of the vehicle 500, infotainment for the vehicle 500, and/or the like.

The vehicle 500 may include a system(s) on a chip (SoC) 504. The SoC 504 may include CPU(s) 506, GPU(s) 508, processor(s) 510, cache(s) 512, accelerator(s) 514, data store(s) 516, and/or other components and features not illustrated. The SoC(s) 504 may be used to control the vehicle 500 in a variety of platforms and systems. For example, the SoC(s) 504 may be combined in a system (e.g., the system of the vehicle 500) with an HD map 522 which may obtain map refreshes and/or updates via a network interface 524 from one or more servers (e.g., server(s) 578 of FIG. 5D).

The CPU(s) 506 may include a CPU cluster or CPU complex (alternatively referred to herein as a "CCPLEX"). The CPU(s) 506 may include multiple cores and/or L2 caches. For example, in some embodiments, the CPU(s) 506 may include eight cores in a coherent multi-processor configuration. In some embodiments, the CPU(s) 506 may include four dual-core clusters where each cluster has a dedicated L2 cache (e.g., a 2 MB L2 cache). The CPU(s) 506 (e.g., the CCPLEX) may be configured to support simultaneous cluster operation enabling any combination of the clusters of the CPU(s) 506 to be active at any given time.

The CPU(s) 506 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 506 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 508 may include an integrated GPU (alternatively referred to herein as an "iGPU"). The GPU(s) 508 may be programmable and may be efficient for parallel workloads. The GPU(s) 508, in some examples, may use an enhanced tensor instruction set.

The GPU(s) 508 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU (s) 508 may include at least eight streaming microprocessors. The GPU(s) 508 may use compute application programming interface(s) (API(s). In addition, the GPU(s) 508 may use one or more parallel computing platforms and/or programming models (e.g., NVIDIA's CUDA).

The GPU(s) 508 may be power-optimized for best performance in automotive and embedded use cases. For example, the GPU(s) 508 may be fabricated on a Fin field-effect transistor (FinFET). However, this is not intended to be limiting and the GPU(s) 508 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an LO instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 508 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random access memory (SGRAM) may be used, such as a graphics double data rate type five synchronous random-access memory (GDDR5).

The GPU(s) 508 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 508 to access the CPU(s) 506 page tables directly. In such examples, when the GPU(s) 508 memory management unit (MMU) experiences a miss, an address translation request may be transmitted to the CPU(s) 506. In response, the CPU(s) 506 may look in its page tables for the virtual-to-physical mapping for the address and transmits the translation back to the GPU(s) 508. As such, unified memory technology may allow a single unified virtual address space for memory of both the CPU(s) 506 and the GPU(s) 508, thereby simplifying the GPU(s) 508 programming and porting of applications to the GPU(s) 508.

In addition, the GPU(s) 508 may include an access counter that may keep track of the frequency of access of the GPU(s) 508 to memory of other processors. The access counter may help ensure that memory pages are moved to the physical memory of the processor that is accessing the pages most frequently.

The SoC(s) 504 may include any number of cache(s) 512, including those described herein. For example, the cache(s) 512 may include an L3 cache that is available to both the CPU(s) 506 and the GPU(s) 508 (e.g., that is connected both the CPU(s) 506 and the GPU(s) 508). The cache(s) 512 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 504 may include an arithmetic logic unit(s) (ALU(s)) which may be leveraged in performing processing with respect to any of the variety of tasks or operations of the vehicle 500—such as processing DNNs. In addition, the SoC(s) 504 may include a floating point unit(s) (FPU(s))—or other math coprocessor or numeric coprocessor types—for performing mathematical operations within the system. For example, the SoC(s) 504 may include one or more FPUs integrated as execution units within a CPU(s) 506 and/or GPU(s) 508.

The SoC(s) 504 may include one or more accelerators 514 (e.g., hardware accelerators, software accelerators, or a combination thereof). For example, the SoC(s) 504 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 508 and to off-load some of the tasks of the GPU(s) 508 (e.g., to free up more cycles of the GPU(s) 508 for performing other tasks). As an example, the accelerator(s) 514 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 514 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 508, and by using an inference accelerator, for example, a designer may target either the DLA(s) or the GPU(s) 508 for any function. For example, the designer may focus processing of CNNs and floating point operations on the DLA(s) and leave other functions to the GPU(s) 508 and/or other accelerator(s) 514.

The accelerator(s) 514 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 506. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g. two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor, The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 514 (e.g., the hardware acceleration cluster) may include a computer vision network on-chip and SRAM, for providing a high-bandwidth, low latency SRAM for the accelerator(s) 514. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 504 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 514 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections, In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 566 output that correlates with the vehicle 500 orientation, distance, 3D location estimates of the object obtained from the neural network and/or other sensors (e.g. LIDAR sensor(s) 564 or RADAR sensor(s) 560), among others.

The SoC(s) 504 may include data store(s) 516 (e.g., memory). The data store(s) 516 may be on-chip memory of the SoC(s) 504, which may store neural networks to be executed on the GPU and/or the DLA. In some examples, the data store(s) 516 may be large enough in capacity to store multiple instances of neural networks for redundancy and safety. The data store(s) 512 may comprise L2 or L3 cache(s) 512. Reference to the data store(s) 516 may include reference to the memory associated with the PVA, DLA, and/or other accelerator(s) 514, as described herein.

The SoC(s) 504 may include one or more processor(s) 510 (e.g., embedded processors). The processor(s) 510 may include a boot and power management processor that may be a dedicated processor and subsystem to handle boot power and management functions and related security enforcement. The boot and power management processor may be a part of the SoC(s) 504 boot sequence and may provide runtime power management services, The boot power and management processor may provide clock and voltage programming, assistance in system low power state transitions, management of SoC(s) 504 thermals and temperature sensors, and/or management of the SoC(s) 504 power states. Each temperature sensor may be implemented as a ring-oscillator whose output frequency is proportional to temperature, and the SoC(s) 504 may use the ring-oscillators to detect temperatures of the CPU(s) 506, GPU(s) 508, and/or accelerator(s) 514. If temperatures are determined to exceed a threshold, the boot and power management processor may enter a temperature fault routine and put the SoC(s) 504 into a lower power state and/or put the vehicle 500 into a chauffeur to safe stop mode (e.g., bring the vehicle 500 to a safe stop).

The processor(s) 510 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 510 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 510 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 510 may further include a real-time camera engine that may include a dedicated processor subsystem for handling real-time camera management.

The processor(s) 510 may further include a high-dynamic range signal processor that may include an image signal processor that is a hardware engine that is part of the camera processing pipeline.

The processor(s) 510 may include a video image compositor that may be a processing block (e.g., implemented on a microprocessor) that implements video post-processing functions needed by a video playback application to produce the final image for the player window. The video image compositor may perform lens distortion correction on wide-view camera(s) 570, surround camera(s) 574, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 508 is not required to continuously render new surfaces. Even when the GPU(s) 508 is powered on and active doing 3D rendering, the video image compositor may be used to offload the GPU(s) 508 to improve performance and responsiveness.

The SoC(s) 504 may further include a mobile industry processor interface (MIPI) camera serial interface for receiving video and input from cameras, a high-speed interface, and/or a video input block that may be used for camera and related pixel input functions. The SoC(s) 504 may further include an input/output controller(s) that may be controlled by software and may be used for receiving I/O signals that are uncommitted to a specific role.

The SoC(s) 504 may further include a broad range of peripheral interfaces to enable communication with peripherals, audio codecs, power management, and/or other devices. The SoC(s) 504 may be used to process data from cameras (e.g. connected over Gigabit Multimedia Serial Link and Ethernet), sensors (e.g., LIDAR sensor(s) 564, RADAR sensor(s) 560, etc. that may be connected over Ethernet), data from bus 502 (e.g. speed of vehicle 500, steering wheel position, etc.), data from GNSS sensor(s) 558 (e.g., connected over Ethernet or CAN bus). The SoC(s) 504 may further include dedicated high-performance mass storage controllers that may include their own DMA engines, and that may be used to free the CPU(s) 506 from routine data management tasks.

The SoC(s) 504 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 504 may be faster, more reliable, and even more energy-efficient and space-efficient than conventional systems. For example, the accelerator(s) 514, when combined with the CPU(s) 506, the GPU(s) 508, and the data store(s) 516, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 520) may include a text and word recognition, allowing the supercomputer to read and understand traffic signs, including signs for which the neural network has not been specifically trained. The DLA may further include a neural network that is able to identify, Interpret, and provides semantic understanding of the sign, and to pass that semantic understanding to the path planning modules running on the CPU Complex. The DLA may further utilize metrics associated with sensor performance as input into one or more neural networks.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 508.

In some examples, a CNN for facial recognition and vehicle owner identification may use data from camera sensors to identify the presence of an authorized driver and/or owner of the vehicle 500. The always on sensor processing engine may be used to unlock the vehicle when the owner approaches the driver door and turn on the lights, and, in security mode, to disable the vehicle when the owner leaves the vehicle. In this way, the SoC(s) 504 provide for security against theft and/or carjacking.

In another example, a CNN for emergency vehicle detection and identification may use data from microphones 596 to detect and identify emergency vehicle sirens. In contrast to conventional systems, that use general classifiers to detect sirens and manually extract features, the SoC(s) 504 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 558. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 562, until the emergency vehicle(s) passes.

The vehicle may include a CPU(s) 518 (e.g., discrete CPU(s), or dCPU(s)), that may be coupled to the SoC(s) 504 via a high-speed interconnect (e.g., PCIe). The CPU(s) 518 may include an X86 processor, for example. The CPU(s) 518 may be used to perform any of a variety of functions, including arbitrating potentially inconsistent results between ADAS sensors and the SoC(s) 504, and/or monitoring the status and health of the controller(s) 536 and/or infotainment SoC 530, for example.

The vehicle 500 may include a GPU(s) 520 (e.g., discrete GPU(s), or dGPU(s)), that may be coupled to the SoC(s) 504 via a high-speed interconnect (e.g. NVIDIA's NVLINK). The GPU(s) 520 may provide additional artificial intelligence functionality, such as by executing redundant and/or different neural networks, and may be used to train and/or update neural networks based on input (e.g., sensor data) from sensors of the vehicle 500.

The vehicle 500 may further include the network interface 524 which may include one or more wireless antennas 526 (e.g., one or more wireless antennas for different communication protocols, such as a cellular antenna, a Bluetooth antenna, etc.). The network interface 524 may be used to enable wireless connectivity over the Internet with the cloud (e.g., with the server(s) 578 and/or other network devices), with other vehicles, and/or with computing devices (e.g., client devices of passengers). To communicate with other vehicles, a direct link may be established between the two vehicles and/or an indirect link may be established (e.g. across networks and over the Internet). Direct links may be provided using a vehicle-to-vehicle communication link. The vehicle-to-vehicle communication link may provide the vehicle 500 information about vehicles in proximity to the vehicle 500 (e.g., vehicles in front of, on the side of, and/or behind the vehicle 500). This functionality may be part of a cooperative adaptive cruise control functionality of the vehicle 500.

The network interface 524 may include a SoC that provides modulation and demodulation functionality and enables the controller(s) 536 to communicate over wireless networks. The network interface 524 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 500 may further include data store(s) 528 which may include off-chip (e.g., off the SoC(s) 504) storage. The data store(s) 528 may include one or more storage elements including RAM, SRAM, DRAM, VRAM, Flash, hard disks, and/or other components and/or devices that may store at least one bit of data.

The vehicle 500 may further include GNSS sensor(s) 558. The GNSS sensor(s) 558 (e.g., GPS, assisted GPS sensors, differential GPS (DGPS) sensors, etc.), to assist in mapping, perception, occupancy grid generation, and/or path planning functions. Any number of GNSS sensor(s) 558 may be used, including, for example and without limitation, a GPS using a USB connector with an Ethernet to Serial (RS-232) bridge.

The vehicle 500 may further include RADAR sensor(s) 560. The RADAR sensor(s) 560 may be used by the vehicle 500 for long-range vehicle detection, even in darkness and/or severe weather conditions, RADAR functional safety levels may be ASIL B.

The RADAR sensor(s) 560 may use the CAN and/or the bus 502 (e.g., to transmit data generated by the RADAR sensor(s) 560) for control and to access object tracking data, with access to Ethernet to access raw data in some examples. A wide variety of RADAR sensor types may be used. For example, and without limitation, the RADAR sensor(s) 560 may be suitable for front, rear, and side RADAR use. In some example, Pulse Doppler RADAR sensor(s) are used.

The RADAR sensor(s) 560 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 560 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 500 surroundings at higher speeds with minimal interference from traffic in adjacent lanes. The other two antennae may expand the field of view, making it possible to quickly detect vehicles entering or leaving the vehicle's 500 lane.

Mid-range RADAR systems may include, as an example, a range of up to 560 m (front) or 80 m (rear), and a field of view of up to 42 degrees (front) or 550 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 500 may further include ultrasonic sensor(s) 562. The ultrasonic sensor(s) 562, which may be positioned at the front, back, and/or the sides of the vehicle 500, may be used for park assist and/or to create and update an occupancy grid. A wide variety of ultrasonic sensor(s) 562 may be used, and different ultrasonic sensor(s) 562 may be used for different ranges of detection (e.g., 2.5 m, 4 m). The ultrasonic sensor(s) 562 may operate at functional safety levels of ASIL B.

The vehicle 500 may include LIDAR sensor(s) 564. The LIDAR sensor(s) 564 may be used for object and pedestrian detection, emergency braking, collision avoidance, and/or other functions. The LIDAR sensor(s) 564 may be functional safety level ASIL B. In some examples, the vehicle 500 may include multiple LIDAR sensors 564 (e.g., two, four, six, etc.) that may use Ethernet (e.g., to provide data to a Gigabit Ethernet switch).

In some examples, the LIDAR sensor(s) 564 may be capable of providing a list of objects and their distances for a 360-degree field of view. Commercially available LIDAR sensor(s) 564 may have an advertised range of approximately 500 m, with an accuracy of 2 cm-3 cm, and with support for a 500 Mbps Ethernet connection, for example. In some examples, one or more non-protruding LIDAR sensors 564 may be used. In such examples, the LIDAR sensor(s) 564 may be implemented as a small device that may be embedded into the front, rear, sides, and/or comers of the vehicle 500. The LIDAR sensor(s) 564, in such examples, may provide up to a 120-degree horizontal and 35-degree vertical field-of-view, with a 200 m range even for low-reflectivity objects. Front-mounted LIDAR sensor(s) 564 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 500. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 564 may be less susceptible to motion blur, vibration, and/or shock.

The vehicle may further include IMU sensor(s) 566. The IMU sensor(s) 566 may be located at a center of the rear axle of the vehicle 500, in some examples. The IMU sensor(s) 566 may include, for example and without limitation, an accelerometer(s), a magnetometer(s), a gyroscope(s), a magnetic compass(es), and/or other sensor types. In some examples, such as in six-axis applications, the IMU sensor (s) 566 may include accelerometers and gyroscopes, while in nine-axis applications, the IMU sensor(s) 566 may include accelerometers, gyroscopes, and magnetometers.

In some embodiments, the IMU sensor(s) 566 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 566 may enable the vehicle 500 to estimate heading without requiring input from a magnetic sensor by directly observing and correlating the changes in velocity from GPS to the IMU sensor(s) 566. In some examples, the IMU sensor(s) 566 and the GNSS sensor(s) 558 may be combined in a single integrated unit.

The vehicle may include microphone(s) 596 placed in and/or around the vehicle 500. The microphone(s) 596 may be used for emergency vehicle detection and identification, among other things.

The vehicle may further include any number of camera types, including stereo camera(s) 568, wide-view camera(s) 570, infrared camera(s) 572, surround camera(s) 574, long-range and/or mid-range camera(s) 598, and/or other camera types. The cameras may be used to capture image data around an entire periphery of the vehicle 500. The types of cameras used depends on the embodiments and requirements for the vehicle 500, and any combination of camera types may be used to provide the necessary coverage around the vehicle 500. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 5A and FIG. 5B.

The vehicle 500 may further include vibration sensor(s) 542. The vibration sensor(s) 542 may measure vibrations of components of the vehicle, such as the axle(s). For example, changes in vibrations may indicate a change in road surfaces. In another example, when two or more vibration sensors 542 are used, the differences between the vibrations may be used to determine friction or slippage of the road surface (e.g., when the difference in vibration is between a power-driven axle and a freely rotating axle).

The vehicle 500 may include an ADAS system 538. The ADAS system 538 may include a SoC, in some examples. The ADAS system 538 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 560, LIDAR sensor(s) 564, and/or a camera(s). The ACC systems may include longitudinal ACC and/or lateral ACC. Longitudinal ACC monitors and controls the distance to the vehicle immediately ahead of the vehicle 500 and automatically adjust the vehicle speed to maintain a safe distance from vehicles ahead. Lateral ACC performs distance keeping, and advises the vehicle 500 to change lanes when necessary. Lateral ACC is related to other ADAS applications such as LCA and CWS.

CACC uses information from other vehicles that may be received via the network interface 524 and/or the wireless antenna(s) 526 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 500), while the I2V communication concept provides information about traffic further ahead. CACC systems may include either or both I2V and V2V information sources. Given the information of the vehicles ahead of the vehicle 500, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 560, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 560, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 500 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 500 if the vehicle 500 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 560, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 500 is backing up. Some RCTW systems include AEB to ensure that the vehicle brakes are applied to avoid a crash. RCTW systems may use one or more rear-facing RADAR sensor(s) 560, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 500, the vehicle 500 itself must, in the case of conflicting results, decide whether to heed the result from a primary computer or a secondary computer (e.g., a first controller 536 or a second controller 536). For example, in some embodiments, the ADAS system 538 may be a backup and/or secondary computer for providing perception information to a backup computer rationality module. The backup computer rationality monitor may run a redundant diverse software on hardware components to detect faults in perception and dynamic driving tasks. Outputs from the ADAS system 538 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LOW when bicyclists or pedestrians are present and a lane departure is, in fact, the safest maneuver, In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 504.

In other examples, ADAS system 538 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 538 may be fed into the primary computer's perception block and/or the primary computer's dynamic driving task block. For example, if the ADAS system 538 indicates a forward crash warning due to an object immediately ahead, the perception block may use this information when identifying objects. In other examples, the secondary computer may have its own neural network which is trained and thus reduces the risk of false positives, as described herein.

The vehicle 500 may further include the infotainment SoC 530 (e.g., an in-vehicle infotainment system (IVI)). Although illustrated and described as a SoC, the infotainment system may not be a SoC, and may include two or more discrete components. The infotainment SoC 530 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 500. For example, the infotainment SoC 530 may radios, disk players, navigation systems, video players, USB and Bluetooth connectivity, carputers, in-car entertainment, Wi-Fi, steering wheel audio controls, hands free voice control, a heads-up display (HUD), an HMI display 534, a telematics device, a control panel (e.g., for controlling and/or interacting with various components, features, and/or systems), and/or other components. The infotainment SoC 530 may further be used to provide information (e.g., visual and/or audible) to a user(s) of the vehicle, such as information from the ADAS system 538, autonomous driving information such as planned vehicle maneuvers, trajectories, surrounding environment information (e.g., intersection information, vehicle information, road information, etc.), and/or other information.

The infotainment SoC 530 may include GPU functionality The infotainment SoC 530 may communicate over the bus 502 (e.g., CAN bus, Ethernet, etc.) with other devices, systems, and/or components of the vehicle 500. In some examples, the infotainment SoC 530 may be coupled to a supervisory MCU such that the GPU of the infotainment system may perform some self-driving functions in the event that the primary controller(s) 536 (e.g., the primary and/or backup computers of the vehicle 500) fail. In such an example, the infotainment SoC 530 may put the vehicle 500 into a chauffeur to safe stop mode, as described herein.

The vehicle 500 may further include an instrument cluster 532 (e.g., a digital dash, an electronic instrument cluster, a digital instrument panel, etc.). The instrument cluster 532 may include a controller and/or supercomputer (e.g., a discrete controller or supercomputer). The instrument cluster 532 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 530 and the instrument cluster 532. In other words, the instrument cluster 532 may be included as part of the infotainment SoC 530, or vice versa.

Figure 5D:
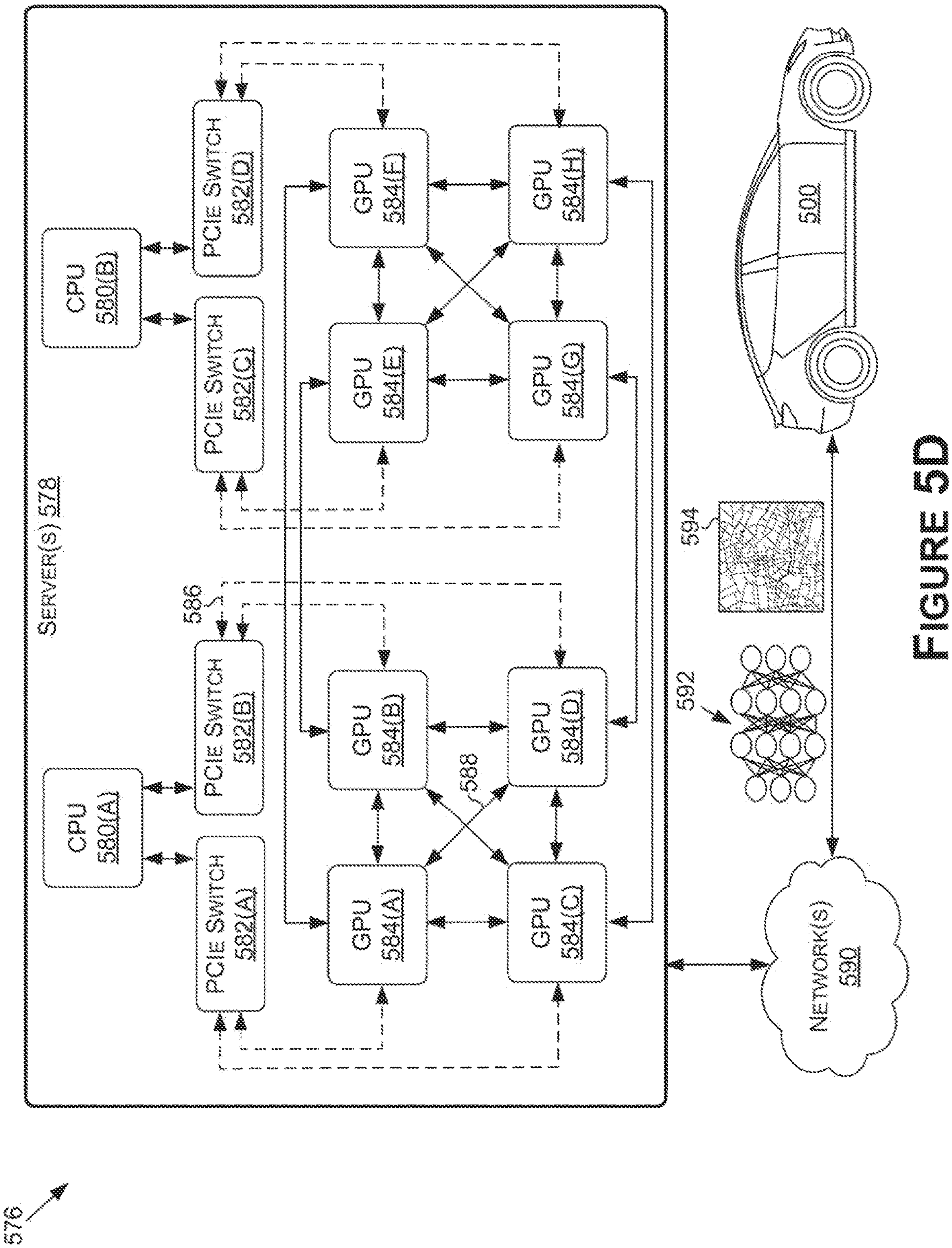
FIG. 5D is a system diagram for communication between cloud-based server(s) and the example autonomous vehicle of FIG. 5A, in accordance with some embodiments of the present disclosure.

FIG. 5D is a system diagram for communication between cloud-based server(s) and the example autonomous vehicle 500 of FIG. 5A, in accordance with some embodiments of the present disclosure. The system 576 may include server(s) 578, network(s) 590, and vehicles, including the vehicle 500. The server(s) 578 may include a plurality of GPUs 584(A)-584(H) (collectively referred to herein as GPUs 584), PCIe switches 582(A)-582(H) (collectively referred to herein as PCIe switches 582), and/or CPUs 580(A)-580(B) (collectively referred to herein as CPUs 580), The GPUs 584, the CPUs 580, and the PCIe switches may be interconnected with high-speed interconnects such as, for example and without limitation, NVLink interfaces 588 developed by NVIDIA and/or PCIe connections 586. In some examples, the GPUs 584 are connected via NVLink and/or NVSwitch SoC and the GPUs 584 and the PCIe switches 582 are connected via PCIe interconnects. Although eight GPUs 584, two CPUs 580, and two PCIe switches are illustrated, this is not intended to be limiting. Depending on the embodiment, each of the server(s) 578 may include any number of GPUs 584, CPUs 580, and/or PCIe switches. For example, the server(s) 578 may each include eight, sixteen, thirty-two, and/or more GPUs 584.

The server(s) 578 may receive, over the network(s) 590 and from the vehicles, image data representative of images showing unexpected or changed road conditions, such as recently commenced road-work. The server(s) 578 may transmit, over the network(s) 590 and to the vehicles, neural networks 592, updated neural networks 592, and/or map information 594, including information regarding traffic and road conditions. The updates to the map information 594 may include updates for the HD map 522, such as information regarding construction sites, potholes, detours, flooding, and/or other obstructions. In some examples, the neural networks 592, the updated neural networks 592, and/or the map information 594 may have resulted from new training and/or experiences represented in data received from any number of vehicles in the environment, and/or based on training performed at a datacenter (e.g., using the server(s) 578 and/or other servers).

The server(s) 578 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 590, and/or the machine learning models may be used by the server(s) 578 to remotely monitor the vehicles.

In some examples, the server(s) 578 may receive data from the vehicles and apply the data to up-to-date real-time neural networks for real-time intelligent inferencing. The server(s) 578 may include deep-learning supercomputers and/or dedicated AI computers powered by GPU(s) 584, such as a DGX and DGX Station machines developed by NVIDIA. However, in some examples, the server(s) 578 may include deep learning infrastructure that use only CPU-powered datacenters.

The deep-learning infrastructure of the server(s) 578 may be capable of fast, real-time inferencing, and may use that capability to evaluate and verify the health of the processors, software, and/or associated hardware in the vehicle 500. For example, the deep-learning infrastructure may receive periodic updates from the vehicle 500, such as a sequence of images and/or objects that the vehicle 500 has located in that sequence of images (e.g., via computer vision and/or other machine learning object classification techniques). The deep-learning infrastructure may run its own neural network to identify the objects and compare them with the objects identified by the vehicle 500 and, if the results do not match and the infrastructure concludes that the AI in the vehicle 500 is malfunctioning, the server(s) 578 may transmit a signal to the vehicle 500 instructing a fail-safe computer of the vehicle 500 to assume control, notify the passengers, and complete a safe parking maneuver.

For inferencing, the server(s) 578 may include the GPU(s) 584 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAS, and other processors may be used for inferencing.

Example Computing Device

Figure 6:
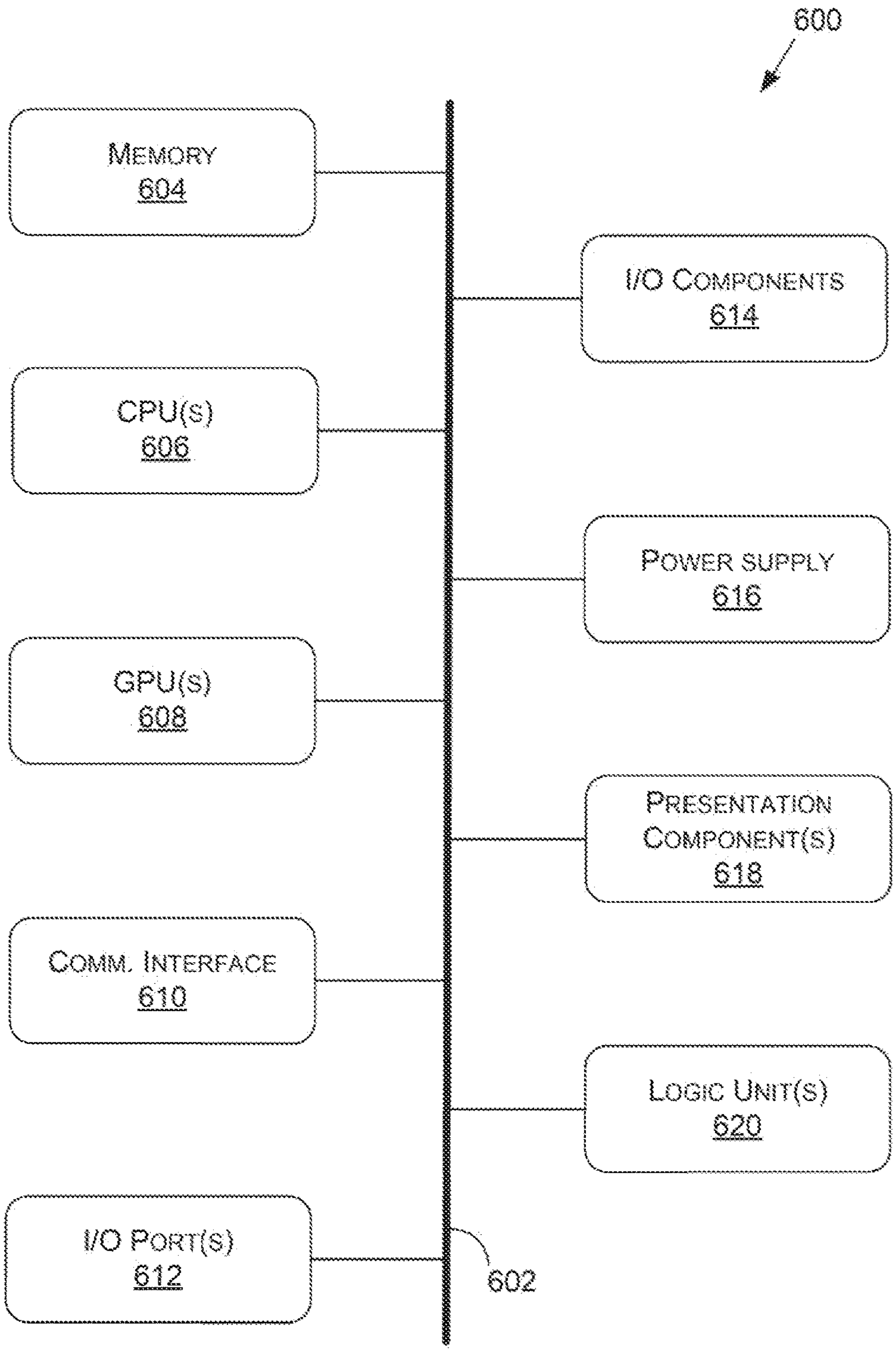
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU), The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUS operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units(TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

In various embodiments, one or more CPU(s) 606, GPU (s) 608, and/or logic unit(s) 620 are configured to execute guest VM 122, server VM 130, user application 124, secure engine server 132, trusted OS 134, and/or trusted key management application 128. Data decrypted, and/or verified using secure engine server 132 for user application 124 and/or for other components executing on computing device (s) 600 can then be used to perform additional processing such as planning and control functions.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g. the GPU(s) 608, the CPU(s) 606, DPUs, etc.), and output the data (e.g., as an image, video, sound, etc.).

Example Data Center

Figure 7:
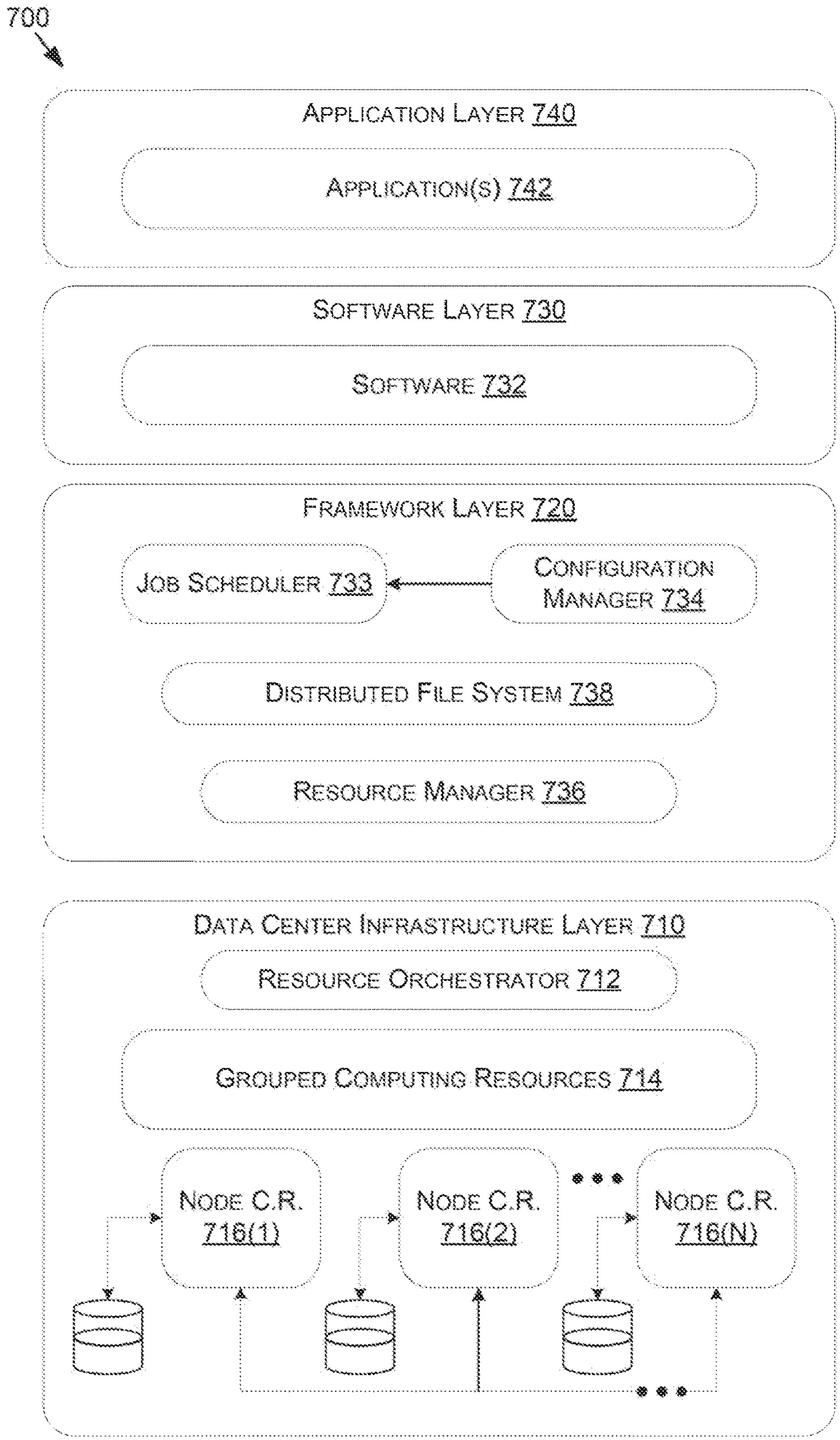
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s")—716(1)-716(N), where "N" represents any whole, positive integer. In at least one embodiment, node C.R.s—716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s—716(1)-716(N) may correspond to a server having one or more of the above-mentioned computing resources. In addition, in some embodiments, the node C.R.s—716(1)-716(N) may include one or more virtual components, such as vGPUs, vCPUs, and/or the like, and/or one or more of the node C.R.s—716 (1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s—716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 733, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing "(e.g., " "ig data"). In at least one embodiment, job scheduler 733 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 733. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s—716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s—716 (1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g. servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing "(e.g.," "ig data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g. a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g. a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

In sum, the disclosed techniques provide a cryptographic system uses a trusted key management application, which executes on a trusted operating system and resides in a trusted execution environment (TEE), and a secure engine server, which performs cryptographic operations using keys stored in the TEE without switching the processor to the TEE. The disclosed cryptographic system also includes an application interface library, which the application invokes to perform cryptographic operations. The cryptographic operations include encryption, decryption, and message authentication code (MAC) generation/verification operations. The application executes in a guest virtual machine (VM) and the secure engine server executes in another guest VM, both of which are managed by a hypervisor. The trusted key management application executes in a TEE on the hypervisor.

Prior to requesting a cryptographic operation, such as encryption or decryption, the application selects a key to be used in subsequent cryptographic operations by sending a key load operation request to the trusted key management application to load a specified key into a key slot in the TEE. The trusted key management application loads the key into the key slot, generates an ephemeral key identifier for use by the application, and stores an association between the key slot and the ephemeral key identifier in a key metadata table in the TEE. The trusted key management application also sends the ephemeral key identifier to (a) the secure engine server and (b) the application interface library, which includes the ephemeral key identifier in subsequent requests.

To perform a cryptographic operation, the application invokes the application interface library using parameters that identify the operation, data to be encrypted or decrypted, and an ephemeral key identifier received from a previous key load operation. The application interface library sends, to the secure engine server, a cryptographic operation request specifying the operation to be performed, data, and the ephemeral key identifier received from the trusted key management application. The secure engine server receives the cryptographic operation request and uses the key metadata to verify that the sending guest VM (and optionally the application) has permission to use the cryptographic key identified by the ephemeral key identifier, and also verifies that the guest VM (and optionally the application) has permission to perform the requested cryptographic operation according to a set of allowed cryptographic operations specified for in the key metadata for the key and guest VM (and optionally the application). Upon successfully verifying the request, the secure engine server uses the key slot identifier received from the trusted key management application causes a security engine to perform the requested cryptographic operation on the application data using the key slot identifier to identify the key that is stored in the TEE.

One technical advantage of the disclosed techniques relative to prior solutions is that cryptographic operations such as encryption and decryption execute in less time, since the cryptographic operations are performed by the secure engine server without switching the processor to the TEE. Prior approaches switch to the TEE for each cryptographic operation requested by an application, and switching the processor execution context substantially increases execution time of cryptographic operations. Another technical advantage of the disclosed techniques is that the cryptographic operations are general purpose operations that can be performed on data in memory locations specified by applications. Thus, the disclosed techniques can be used by applications to encrypt any specified data at any point during application execution without additional processing or conversion to adapt the data for use by an inline encryption engine or other special-purpose hardware.

1. In some embodiments, a method comprises: receiving, from an application executing in a virtual machine (VM), a request to perform a cryptographic operation, wherein the request specifies an ephemeral key identifier and source data; determining, using key metadata received from a trusted execution environment, a key slot identifier associated with the ephemeral key identifier, wherein the key slot identifier identifies a key slot in which a cryptographic key is stored; causing the cryptographic operation to be performed on the source data in the trusted execution environment using the cryptographic key, wherein the cryptographic key used to perform the cryptographic operation is accessed from the key slot identified by the key slot identifier; and providing, to the application, a cryptographic operation result received from the trusted execution environment.

2 The method of clause 1, wherein the key metadata is stored in a key metadata table, and at least a portion of the key metadata table is received from a trusted key management application executing in the trusted execution environment.

3. The method of clauses 1 or 2, further comprising: receiving, from a trusted operating system executing in the trusted execution environment, the ephemeral key identifier and the key slot identifier associated with the ephemeral key identifier; and storing, in the key metadata table, a record comprising the ephemeral key identifier and the key slot identifier.

4. The method of any of clauses 1-3, wherein determining, using the key metadata received from a trusted execution environment, the key slot identifier associated with the ephemeral key identifier comprises: identifying, in the key metadata table, the record comprising the ephemeral key identifier, wherein the record specifies the key slot identifier.

5. The method of any of clauses 1-4, further comprising: identifying the virtual machine based on a channel identifier associated with an inter-VM communication channel from which the request to perform the cryptographic operation is received.

6. The method of any of clauses 1-5, wherein the virtual machine is identified using a channel mapping table that associates one or more channel identifiers with one or more corresponding VM identifiers, and the channel mapping table associates the channel identifier with a VM identifier that identifies the virtual machine.

7 The method of any of clauses 1-6, further comprising verifying, using the key metadata, that the virtual machine has permission to use the cryptographic key specified by the ephemeral key identifier.

8. The method of any of clauses 1-7, wherein the verifying that the virtual machine has permission to use the cryptographic key specified by the ephemeral key identifier comprises: searching a key metadata table for a matching key metadata record having a stored ephemeral key identifier that corresponds to the ephemeral key identifier specified in the request to perform the cryptographic operation and further having a stored VM identifier that matches a VM identifier of the virtual machine from which the request to perform the cryptographic operation was received, wherein the virtual machine has permission to use the cryptographic key specified by the ephemeral key identifier if the searching determines that the matching key metadata record is present in the key metadata table.

9. The method of any of clauses 1-8, further comprising verifying, using the key metadata, that the virtual machine has permission to perform the cryptographic operation.

10. The method of any of clauses 1-9, wherein the verifying that the virtual machine has permission to perform the cryptographic operation comprises: searching a key metadata table for a matching key metadata record having a stored ephemeral key identifier that corresponds to the ephemeral key identifier specified in the request to perform the cryptographic operation and further having a stored VM identifier that matches a VM identifier of the virtual machine from which the request to perform the cryptographic operation was received, wherein the virtual machine has permission to perform the cryptographic operation specified by the ephemeral key identifier if the searching determines that the matching key metadata record is present in the key metadata table and the cryptographic operation is included in a set of one or more allowed operations specified by the matching key metadata record.

11. The method of any of clauses 1-10, wherein the request to perform a cryptographic operation is received when a processor is operating in a non-secure state.

12. The method of any of clauses 1-11, wherein the key slot is a storage register in a security engine and is accessible when a processor is operating in a secure state.

13. The method of any of clauses 1-12, wherein the cryptographic operation is performed by the security engine in the trusted execution environment, and the cryptographic operation result is received from the security engine.

14. In some embodiments, a processor comprises: one or more processing units to perform operations comprising: receiving, from an application executing in a virtual machine (VM), a request to perform a cryptographic operation, wherein the request specifies an ephemeral key identifier and source data; determining, using key metadata received from a trusted execution environment, a key slot identifier associated with the ephemeral key identifier, wherein the key slot identifier identifies a key slot in which a cryptographic key is stored; causing the cryptographic operation to be performed on the source data in the trusted execution environment using the cryptographic key, wherein the cryptographic key used to perform the cryptographic operation is accessed from the key slot identified by the key slot identifier; and providing, to the application, a cryptographic operation result received from the trusted execution environment.

15. The processor of clause 14, wherein the key metadata is stored in a key metadata table, and at least a portion of the key metadata table is received from a trusted key management application executing in the trusted execution environment.

16. The processor of clauses 14 or 15, wherein the operations further comprise: receiving, from a trusted operating system executing in the trusted execution environment, the ephemeral key identifier and the key slot identifier associated with the ephemeral key identifier; and storing, in the key metadata table, a record comprising the ephemeral key identifier and the key slot identifier.

17. The processor of any of clauses 14-16, wherein determining, using the key metadata received from a trusted execution environment, the key slot identifier associated with the ephemeral key identifier comprises: identifying, in the key metadata table, the record comprising the ephemeral key identifier, wherein the record specifies the key slot identifier.

18. The processor of any of clauses 14-17, wherein the processor is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system implementing one or more large language models (LLMs); a system for generating synthetic data; a system incorporating one or more virtual machines (VMs); a system implemented at least partially in a data center; or a system implemented at least partially using cloud computing resources.

19. In some embodiments, a system comprises: one or more processors to perform operations comprising: receiving, from an application executing in a virtual machine (VM), a request to perform a cryptographic operation, wherein the request specifies an ephemeral key identifier and source data; determining, using key metadata received from a trusted execution environment, a key slot identifier associated with the ephemeral key identifier, wherein the key slot identifier identifies a key slot in which a cryptographic key is stored; causing the cryptographic operation to be performed on the source data in the trusted execution environment using the cryptographic key, wherein the cryptographic key used to perform the cryptographic operation is accessed from the key slot identified by the key slot identifier; and providing, to the application, a cryptographic operation result received from the trusted execution environment.

20. The system of clause 19, wherein the system is comprised in at least one of: a control system for an autonomous or semi-autonomous machine; a perception system for an autonomous or semi-autonomous machine; a system for performing simulation operations; a system for performing digital twin operations; a system for performing light transport simulation; a system for performing collaborative content creation for 3D assets; a system for performing deep learning operations; a system implemented using an edge device; a system for generating or presenting at least one of virtual reality content, augmented reality content, or mixed reality content; a system implemented using a robot; a system for performing conversational AI operations; a system implementing one or more large language models (LLMs); a system for generating synthetic data; a system incorporating one or more virtual machines (VMs); a system implemented at least partially in a data center; or a system implemented at least partially using cloud computing resources.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:

receiving, from an application executing in a virtual machine (VM), a request to perform a cryptographic operation, wherein the request specifies an ephemeral key identifier and source data;

determining, using key metadata received from a trusted execution environment, a key slot identifier associated with the ephemeral key identifier, wherein the key slot identifier identifies a key slot in which a cryptographic key is stored;

causing the cryptographic operation to be performed on the source data in the trusted execution environment using the cryptographic key, wherein the cryptographic key used to perform the cryptographic operation is accessed from the key slot identified by the key slot identifier; and providing, to the application, a cryptographic operation result received from the trusted execution environment.

2. The method of claim 1, wherein the key metadata is stored in a key metadata table, and at least a portion of the key metadata table is received from a trusted key management application executing in the trusted execution environment.

3. The method of claim 2, further comprising:

receiving, from a trusted operating system executing in the trusted execution environment, the ephemeral key identifier and the key slot identifier associated with the ephemeral key identifier; and storing, in the key metadata table, a record comprising the ephemeral key identifier and the key slot identifier.

4. The method of claim 3, wherein determining, using the key metadata received from a trusted execution environment, the key slot identifier associated with the ephemeral key identifier comprises:

identifying, in the key metadata table, the record comprising the ephemeral key identifier, wherein the record specifies the key slot identifier.

5. The method of claim 1, further comprising:

identifying the virtual machine based on a channel identifier associated with an inter-VM communication channel from which the request to perform the cryptographic operation is received.

6. The method of claim 5, wherein the virtual machine is identified using a channel mapping table that associates one or more channel identifiers with one or more corresponding VM identifiers, and the channel mapping table associates the channel identifier with a VM identifier that identifies the virtual machine.

7. The method of claim 1, further comprising verifying, using the key metadata, that the virtual machine has permission to use the cryptographic key specified by the ephemeral key identifier.

8. The method of claim 7, wherein the verifying that the virtual machine has permission to use the cryptographic key specified by the ephemeral key identifier comprises:

searching a key metadata table for a matching key metadata record having a stored ephemeral key identifier that corresponds to the ephemeral key identifier specified in the request to perform the cryptographic operation and further having a stored VM identifier that matches a VM identifier of the virtual machine from which the request to perform the cryptographic operation was received, wherein the virtual machine has permission to use the cryptographic key specified by the ephemeral key identifier if the searching determines that the matching key metadata record is present in the key metadata table.

9. The method of claim 1, further comprising verifying, using the key metadata, that the virtual machine has permission to perform the cryptographic operation.

10. The method of claim 9, wherein the verifying that the virtual machine has permission to perform the cryptographic operation comprises:

searching a key metadata table for a matching key metadata record having a stored ephemeral key identifier that corresponds to the ephemeral key identifier specified in the request to perform the cryptographic operation and further having a stored VM identifier that matches a VM identifier of the virtual machine from which the request to perform the cryptographic operation was received, wherein the virtual machine has permission to perform the cryptographic operation specified by the ephemeral key identifier if the searching determines that the matching key metadata record is present in the key metadata table and the cryptographic operation is included in a set of one or more allowed operations specified by the matching key metadata record.

11. The method of claim 1, wherein the request to perform a cryptographic operation is received when a processor is operating in a non-secure state.

12. The method of claim 1, wherein the key slot is a storage register in a security engine and is accessible when a processor is operating in a secure state.

13. The method of claim 12, wherein the cryptographic operation is performed by the security engine in the trusted execution environment, and the cryptographic operation result is received from the security engine.

14. A processor comprising:
one or more processing units to perform operations comprising:
receiving, from an application executing in a virtual machine (VM), a request to perform a cryptographic operation, wherein the request specifies an ephemeral key identifier and source data;
determining, using key metadata received from a trusted execution environment, a key slot identifier associated with the ephemeral key identifier, wherein the key slot identifier identifies a key slot in which a cryptographic key is stored;
causing the cryptographic operation to be performed on the source data in the trusted execution environment using the cryptographic key, wherein the cryptographic key used to perform the cryptographic operation is accessed from the key slot identified by the key slot identifier; and
providing, to the application, a cryptographic operation result received from the trusted execution environment.

15. The processor of claim 14, wherein the key metadata is stored in a key metadata table, and at least a portion of the key metadata table is received from a trusted key management application executing in the trusted execution environment.

16. The processor of claim 15, wherein the operations further comprise:
receiving, from a trusted operating system executing in the trusted execution environment, the ephemeral key identifier and the key slot identifier associated with the ephemeral key identifier; and
storing, in the key metadata table, a record comprising the ephemeral key identifier and the key slot identifier.

17. The processor of claim 16, wherein determining, using the key metadata received from a trusted execution environment, the key slot identifier associated with the ephemeral key identifier comprises:
identifying, in the key metadata table, the record comprising the ephemeral key identifier, wherein the record specifies the key slot identifier.

18. The processor of claim 14, wherein the processor is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system for generating or presenting at least one of virtual reality content, augmented reality content, or mixed reality content;
a system implemented using a robot;
a System for performing conversational AI operations;
a system implementing one or more large language models (LLMs);
a system for generating synthetic data;
a system incorporating one or more virtual machines (VMs);
a system implemented at least partially in a data center; or
a system implemented at least partially using cloud computing resources.

19. A system, comprising:
one or more processors to perform operations comprising:
receiving, from an application executing in a virtual machine (VM), a request to perform a cryptographic operation, wherein the request specifies an ephemeral key identifier and source data;
determining, using key metadata received from a trusted execution environment, a key slot identifier associated with the ephemeral key identifier, wherein the key slot identifier identifies a key slot in which a cryptographic key is stored;
causing the cryptographic operation to be performed on the source data in the trusted execution environment using the cryptographic key, wherein the cryptographic key used to perform the cryptographic operation is accessed from the key slot identified by the key slot identifier; and
providing, to the application, a cryptographic operation result received from the trusted execution environment.

20. The system of claim 19, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system for generating or presenting at least one of virtual reality content, augmented reality content, or mixed reality content;
a system implemented using a robot;
a system for performing conversational AI operations;
a system implementing one or more large language models (LLMs);
a system for generating synthetic data;
a system incorporating one or more virtual machines (VMs);
a system implemented at least partially in a data center; or
a system implemented at least partially using cloud computing resources.

* * * * *